(12) United States Patent
Early et al.

(10) Patent No.: US 6,676,402 B1
(45) Date of Patent: Jan. 13, 2004

(54) LASER IGNITION

(75) Inventors: James W. Early, Los Alamos, NM (US); Charles S. Lester, San Juan Pueblo, NM (US)

(73) Assignee: The Regents of the University of California, Los Alamos, NM (US)

( * ) Notice: Subject to any disclaimer, the term of this patent is extended or adjusted under 35 U.S.C. 154(b) by 202 days.

(21) Appl. No.: 09/927,862

(22) Filed: Aug. 10, 2001

Related U.S. Application Data

(63) Continuation-in-part of application No. 09/267,122, filed on Mar. 9, 1999, which is a continuation-in-part of application No. 08/861,214, filed on May 21, 1997, now abandoned.
(60) Provisional application No. 60/044,483, filed on Apr. 21, 1997.

(51) Int. Cl.⁷ ............................................... F23Q 21/00
(52) U.S. Cl. ............................. 431/1; 431/6; 431/258; 123/143 B; 123/DIG. 9; 60/39.821; 372/23; 372/25
(58) Field of Search .......................... 431/1, 2, 6, 258; 123/143 R, 143 B, DIG. 9; 60/39.821; 372/23, 25, 69, 70, 71, 92, 94, 97

(56) References Cited

U.S. PATENT DOCUMENTS

| | | |
|---|---|---|
| 3,427,118 A | 2/1969 | Andress et al. |
| 3,902,036 A | 8/1975 | Zaleckas |
| 4,302,933 A | 12/1981 | Smith |
| 4,416,226 A | 11/1983 | Nishida et al. |
| 4,434,753 A | 3/1984 | Mukainakano et al. |
| 4,702,808 A | 10/1987 | Lemelson |
| 4,870,244 A | 9/1989 | Copley et al. |
| 4,947,640 A | 8/1990 | Few et al. |
| 5,157,676 A | 10/1992 | Wilcox |
| 5,206,455 A | 4/1993 | Williams et al. |
| 5,328,665 A | 7/1994 | Geiger |
| 5,367,869 A | 11/1994 | DeFreitas |
| 5,404,712 A | 4/1995 | Few et al. |
| 5,485,720 A | 1/1996 | Few et al. |
| 5,497,612 A | 3/1996 | Few et al. |
| 5,756,924 A | 5/1998 | Early |
| 6,305,929 B1 * | 10/2001 | Chung et al. ............... 431/258 |

* cited by examiner

*Primary Examiner*—Sara Clarke
(74) *Attorney, Agent, or Firm*—Gemma Morrison Bennett

(57) ABSTRACT

Sequenced pulses of light from an excitation laser with at least two resonator cavities with separate output couplers are directed through a light modulator and a first polarzing analyzer. A portion of the light not rejected by the first polarizing analyzer is transported through a first optical fiber into a first ignitor laser rod in an ignitor laser. Another portion of the light is rejected by the first polarizing analyzer and directed through a halfwave plate into a second polarization analyzer. A first portion of the output of the second polarization analyzer passes through the second polarization analyzer to a second, oscillator, laser rod in the ignitor laser. A second portion of the output of the second polarization analyzer is redirected by the second polarization analyzer to a second optical fiber which delays the beam before the beam is combined with output of the first ignitor laser rod. Output of the second laser rod in the ignitor laser is directed into the first ignitor laser rod which was energized by light passing through the first polarizing analyzer. Combined output of the first ignitor laser rod and output of the second optical fiber is focused into a combustible fuel where the first short duration, high peak power pulse from the ignitor laser ignites the fuel and the second long duration, low peak power pulse directly from the excitation laser sustains the combustion.

33 Claims, 9 Drawing Sheets

LASER IGNITION

This application is a continuation in part of patent application Ser. No. 09/267,122, filed Mar. 9, 1999, which was a continuation in part of patent application Ser. No. 08/861,214 filed May 21, 1997 now abandoned, which had benefit of Provisional Patent Application No. 60/044,483 filed Apr. 21, 1997.

This invention was made with government support under Contract No. W-7405-ENG-36 awarded by the U.S. Department of Energy. The government has certain rights in the invention.

TECHNICAL FIELD

This invention relates to a method and apparatus for laser ignition.

BACKGROUND ART

Laser light has been used to initiate the ignition of fuel/oxidizer mixtures by use of laser-spark, air-breakdown ignition methods in which a single, high peak power laser light pulse from a Q-switched laser is used to initiate fuel ignition by generating high temperatures and an ionization plasma. These laser ignition methods and apparatuses are generally unreliable except within narrow ranges of fuel parameters such as fuel/oxidizer ratios, fuel droplet size, number density and velocity within a fuel aerosol, and initial fuel and air temperatures.

After initial ignition, sustaining ignition of fuel/oxidizer mixtures is typically accomplished by use of a laser light pulse from a Q-switched laser with a pulse width and pulse energy which will provide the peak power density required to initiate plasma formation and to satisfy concurrently the need for time-averaged power for sustaining the ignition. This requires fragile, bulky laser excitation sources such as flashlamps or laser diodes which are often difficult to fit proximate to fuel combustion zones, particularly in fuel combustion zones in places such as aircraft engines. Fuel combustion zones are usually harsh, mechanically adverse environments that necessitate sturdy design or frequent replacement of ignition devices subjected to those environments.

Thus there is still a need for a laser ignition process which can reliably ignite gaseous or aerosol fuel mixtures within a broad range of parameters such as fuel/oxidizer ratios, fuel droplet size, number density and velocity within a fuel aerosol, and initial fuel temperatures as well as a need for means for ignition within small spaces under mechanically adverse conditions.

Therefore, it is an object of this invention to provide a reliable ignition method and apparatus.

It is another object of this invention to provide a method and apparatus for laser ignition of gaseous or aerosol fuel mixtures within a broad range of parameters such as fuel/oxidizer ratios, fuel droplet size, number density and velocity within a fuel aerosol, and initial fuel temperatures.

It is yet another object of this invention to provide an economical method and apparatus for laser ignition of gaseous or aerosol fuel mixtures.

It is a further object of this invention to provide a method and apparatus for laser ignition of gaseous or aerosol fuel mixtures within small spaces under mechanically adverse conditions.

It is yet a further object of this invention to provide a method and apparatus for elimination of fragile and bulky laser excitation sources such as flashlamps or laser diodes from fuel igniting lasers located proximately to fuel combustion zones.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims which are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a fuel ignition apparatus and method in which an excitation light source is used to activate one or more small ignitor lasers located remotely from the excitation light source and more proximately to one or more fuel combustion zones. Using a separate excitation light source to pump the lasers which ignite the fuel eliminates the need for large, heavy, fragile or complex excitation sources in the harsh operating environments of fuel combustion chambers. Durable, reliable, economical ignition of gaseous or aerosol fuel mixtures can be accomplished with the invention apparatus and method.

In an alternative to the fourth embodiment of the invention which is claimed in this patent, excitation light is provided by a laser with at least two resonator cavities with a common high reflecting end mirror and separate output couplers. The sequenced pulses of light from the single excitation laser are directed through a light modulator such as a Pockel's cell and a first polarizing analyzer where a portion of the light is not rejected by the first polarizing analyzer, is transported through a first optical fiber into a first ignitor laser rod in an ignitor laser and another portion of the light is rejected by the first polarizing analyzer and directed through a halfwave plate into a second polarization analyzer. A first portion of the output of the second polarization analyzer: (a) passes through the second polarization analyzer to a second, oscillator, laser rod in the ignitor laser; and a second portion of the output of the second polarization analyzer (b) is redirected by the second polarization analyzer to a second optical fiber which delays the beam before the beam is combined with output of the first ignitor laser rod. Output of the second laser rod in the ignitor laser is directed into the first ignitor laser rod which was energized by the light passing through the first polarizing analyzer., The combined output of the first ignitor laser rod and the output of the second optical fiber is focused into a focal point in an aerosol spray or cloud of a combustible fuel where the first short duration high peak power pulse from the ignitor laser breaks down and ignites the fuel and the second long duration low peak power pulse directly from the excitation laser sustains the plasma formed by contact of the short duration high peak power pulse with the fuel.

Any of the invention apparatuses can have an optical multiplexing feature positioned to receive output of a single excitation light source and to direct beams in an ordered sequence or in a random sequence through beam splitters into pairs of first and second optical fibers, each pair of which is associated with an ignitor laser.

BRIEF DESCRIPTION OF THE DRAWINGS

The accompanying drawings, which are incorporated in and form a part of the specification, illustrate five preferred embodiments of the present invention and, together with the description, serve to explain the principles of the invention. In the drawings.

BEST MODES FOR CARRYING OUT THE INVENTION

Figure 1:
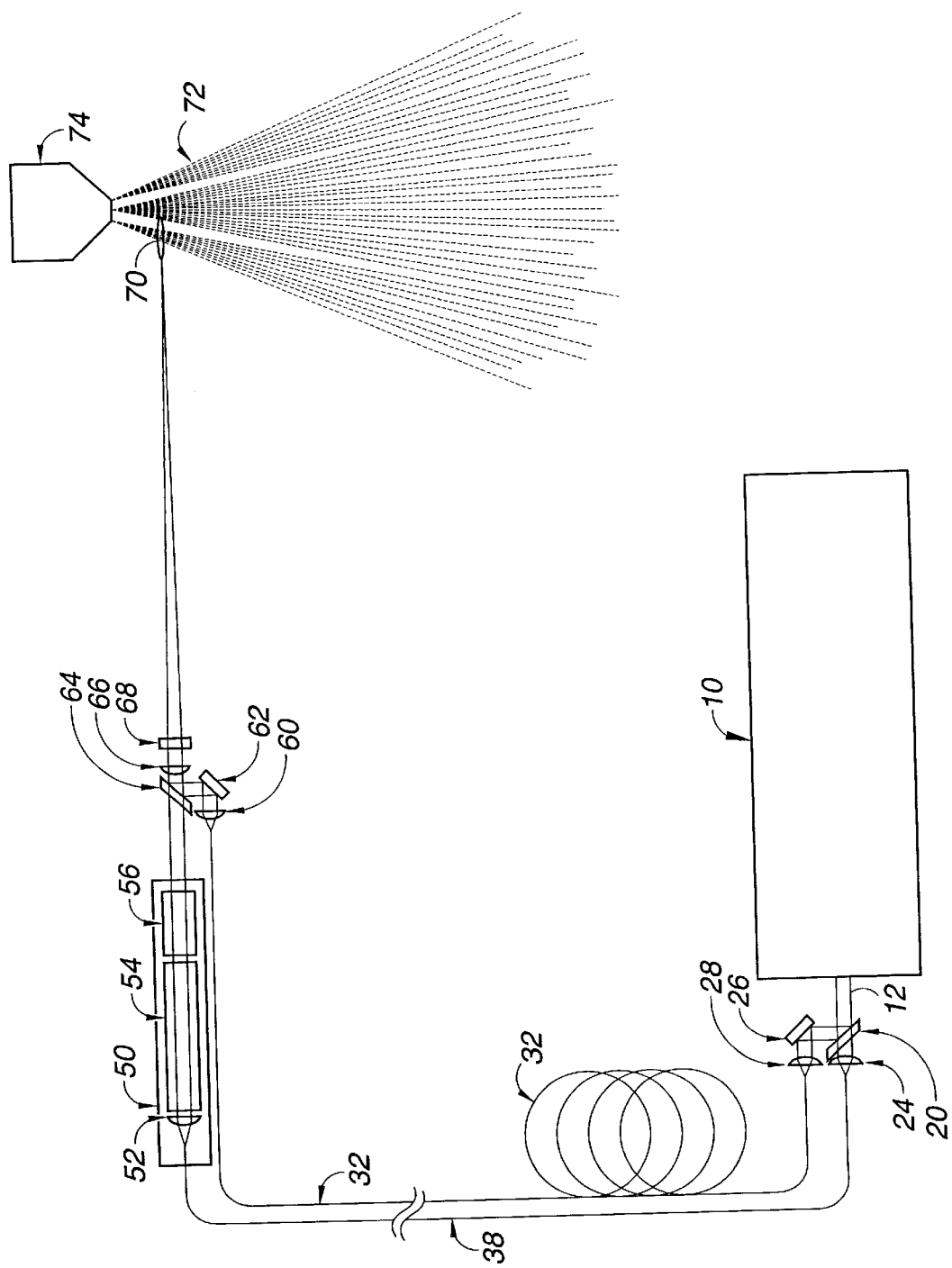
FIG. 1 is a schematic diagram of a first embodiment of the invention employing a remote excitation laser to pump a single ignitor laser and to provide light which is delayed and then combined with the output of the ignitor laser for application of dual pulses to a focal point in a combustion zone.

The invention ignition method utilizes a combination of short and long duration light pulse lengths from a single excitation light source and one or more lasers, or two or more lasers in series, to provide fuel ignition performance which is superior to conventional laser-based methods with respect to reliability, laser energy efficiency and insensitivity to fuel/air composition and fuel temperatures.

Dual pulse ignition such as that described in U.S. Pat. No. 5,756,924 can be accomplished using the apparatus and methods of this invention. Dual pulse ignition requires application of a short duration high peak power laser pulse to an aerosol spray or cloud of fuel to generate an air-breakdown plasma within the fuel, followed by application of a second, lower peak power, longer duration laser pulse to sustain the plasma and achieve efficient fuel ignition. Unique laser pulse temporal formats and sequencing are necessary.

In each embodiment of the present invention, a single excitation light source is used to provide low peak power long duration pulses of excitation light to one or more small ignitor lasers located more proximately than the excitation light source to one or more fuel combustion zones. By serving as a pulse compressor, the small ignitor laser or lasers provide high peak power short duration laser light pulses for the air-breakdown plasma formation in the fuel aerosol spray or cloud. Long duration low peak power pulses from the excitation light source sustain the air-breakdown plasmas for efficient and stable ignition.

Thus, the light from the excitation light source serves a dual role: (a) providing light for excitation of the ignitor laser; and (b) providing light for energizing and sustaining the plasma produced in the fuel by light from the ignitor laser.

The excitation light source generally is a laser, but may also be a light emitting diode or a flashlamp. Any of a variety of laser systems may be used as an excitation laser light source. For example, excitation laser light may be generated by a Q-switched, cavity dumped or free running laser. For the fifth embodiment of the invention, an excitation light source which can produce more than one wavelength of light is needed.

Q-switched pulses can be obtained from the excitation laser by either active or passive Q-switching of the laser. Excitation lasers which are active or passive Q-switched can be used for all four embodiments of the invention. Generally presently preferred, particularly for the third, fourth and fifth embodiments of the invention, are active Q-switched solid-state laser systems to reduce timing jitter.

A wavelength tunable, Q-switched Cr:LiSAF laser that can be tuned over a wavelength range from about 800 to about 1000 nanometers is presently preferred. The output of such a laser can be tuned to a wavelength of 808 nanometers, which is a wavelength that can efficiently pump a Nd:YAG ignitor laser rod and many other Nd-doped host laser materials that would be used in a Nd:YAG ignitor laser.

Other good choices for the excitation laser are: an alexandrite laser operating at 750 nanometers, which can also be used to pump a Nd:YAG ignitor laser; or a Ti:sapphire laser. Other tunable lasers or light emitting diodes or flashlamps can be employed as excitation light sources in the practice of the invention, depending upon specific ignition conditions and the type of ignitor laser employed.

The excitation laser may be energized by flashlamps or diodes. The excitation laser may be cooled by any suitable means such as water cooling, air cooling, or thermo-electric cooling.

For all embodiments of the invention, the excitation laser can be operated in continuous or pulsed mode. Pulsed mode is generally preferred for economics of energy. A summary of the operating parameters for the excitation laser in each embodiment of the invention are shown in Tables 1, 2, 3, 4 and 5.

Any wavelength in the range from the ultraviolet to the infrared portion of the light spectrum could be useful for the longer duration lower peak power pulse from the excitation light source, depending upon the choice of laser material for the ignitor laser, the type of fuel, and the combustion conditons. The excitation light source must be operated at a wavelength within the range which is absorbed by the laser material utilized as the active lasing medium of the ignitor laser. Absorption of the excitation light by the ignitor laser material is required for energizing the laser material of the ignitor laser. Generally, for the portion of the light from the excitation light source used to sustain the plasma, longer wavelengths up to about 12 microns of light are preferred.

The light pulse from the excitation light source must be of sufficient peak power to efficiently pump the plasma generated by the ignitor laser, but need be of no greater peak power. A peak power of greater than 70 kW is generally sufficient, depending upon the type of fuel used and combustion environment conditions.

Generally presently preferred excitation light pulse energy is in the range from about 50 to about 300 mJ, depending upon fuel conditions and the type of ignition to be performed.

The duration or temporal length (pulse width) of the ignitor laser light pulse appropriate for the plasma generation function generally may be anywhere from 10 or fewer nanoseconds to about 200 nanoseconds in duration, depending upon the light pulse energy available. The temporal length of the long duration lower peak power laser pulse from the excitation laser light source is preferably at least as large or larger than that of the short duration higher peak power laser pulse from the ignitor laser. Presently preferred are excitation laser light pulse lengths in the range between about 50 and about 1 microsecond, depending upon the laser pulse energy.

In the first two embodiments of the invention, the two portions into which the beam from the excitation light source is split are generally of the same intensity although portions of the beam with differing intensities can be used. In the fifth embodiment, the two different wavelengths of light from the excitation light source can be of the same or different intensities. In the third and fifth embodiments of the invention, the beam or beams from the excitation light source are not split, but are delivered through a single optical fiber to the ignitor laser in the selected sequenced pulse format.

Presently preferred optical fibers are multiple-mode optical fibers, but multiple fiber bundles can also be used for transporting the laser light pulses. Single mode optical fibers are generally not as useful because the smaller fibers cannot carry the high peak power needed. A multiple-mode fiber with a core diameter in the range from about 50 microns to about 1 millimeter generally can accommodate transport of the typical peak power without damage to the optical fiber. Multiple-mode fibers with core diameters of about 400 microns are presently preferred because these are large enough to carry the high peak power needed without damage to the optical fiber.

A taper at the input end of the optical fiber can be used to enhance efficiency of light injection and inhibit fiber damage.

Any suitable device can be used for combining the beams, including, but not limited to, beam combiners, reflective devices and optical fiber couplers.

The ignitor laser or lasers for any of the embodiments of this invention can be and generally is a modified laser having a laser rod, optical resonator cavity, and a Q-switch, but little else.

The ignitor laser needs no pumping diodes or flashlamps because it is pumped by light coming through at least one fiber optic line from the excitation light source. Thus the ignitor laser can be a small, durable unit which can withstand a harsh fuel ignition environment.

Passive Q-switched ignitor lasers are presently preferred because of the high voltage needed for active Q-switching. High voltage in the proximity of a fuel combustion zone is undesirable because of maintenance and safety problems associated with high voltage in the fuel combustion zone.

The ignitor laser rod (lasing medium) can be made of any Q-switchable, solid-state laser material which will provide light output within the desired wavelength and peak power range. Although many types of solid-state lasing material can be employed for the active lasing medium, neodymium doped yttrium aluminum garnet (Nd:YAG) is presently preferred because of its economy and good thermal properties. Neodymium doped yttrium aluminum garnet lases at a wavelength of 1064 nanometers. Other useful ignitor laser rod materials include, but are not limited to, Cr:Nd:GSGG, Nd:glass or neodymium doped yttrium lithium fluoride (Nd:YLF).

The resonant cavity of the ignitor laser can be of either stable or unstable configuration and is bounded by light reflective coatings placed upon optical surfaces. The coated optical surfaces may be curved or flat, depending upon cavity configuration (stable or unstable). A first coating can be upon the surface of the collimating lens facing the input end of the ignitor lasing rod or upon the input end of the ignitor lasing rod. The first coating must be of a dichroic nature, that is, highly reflective for lasing wavelengths and highly transmissive for the excitation wavelengths. A second coating is generally placed upon the output end of the Q-switch to form an output coupling reflector for the selected wavelength of light.

The size of the ignitor laser rod can vary greatly, depending upon the application.

The diameter of the Q-switch is preferably matched to the rod diameter with thickness of the Q-switch depending upon the dopant level needed for the selected optical density.

All components of the ignitor laser can be mounted in a cylindrical tube to become a virtually monolithic unit. Metal or ceramic material is generally considered most suitable for the ignitor laser encasement, although other materials can be used with good results.

For aircraft applications ignitor laser rods with a length in the range from 0.5 to no more than 20 centimeters and with a rod diameter from about 1 mm to 10 or more millimeters are generally preferred, depending upon the absorptive properties of the rod to the excitation light and the maximum pulse energy desired. Presently preferred dimensions of an ignitor laser to be used for aircraft engine ignition are in the range from 1 to 12 centimeters in length and from 1 to 6 millimeters in diameter. These smaller ignitor lasers are preferred because larger sizes would defeat the purposes of having a small, economical, easily positioned ignitor laser which directly replaces the currently used capacitive discharge spark ignitor.

The ignitor laser can be cooled by any suitable means such as air cooling, circulated water cooling, thermal-electric cooling, or use of phase transition material. Air cooling is presently preferred because of the simplicity, economy and ignitor dimensions.

For each of the embodiments of the invention it is generally presently preferred that the ignitor laser be operated in pulsed mode.

The ignitor laser is used to produce laser light having temporal lengths or pulse widths in the range from about 1 to about 60 nanoseconds, with pulse energies in the range from about 10 mJ to about 250 mJ being presently preferred, depending upon type of fuel used and combustion temperatures.

Which wavelengths from the ignitor laser are most effective depends upon the fuel breakdown processes. Resonant excitation and ionization of the fuel/oxidizer components are typically obtained by utilizing short light wavelengths which are preferred due to the greater efficiency in the ionization yield. For non-resonant ionization of fuel/oxidizer components, wavelengths from as short as 200 nanometers to as long as 12 microns can be effectively used depending upon choice of fuel. Generally presently preferred for most common fuels are wavelengths in the infrared range from about 700 nanometers to about 3 microns.

Operating parameters for the ignitor laser or lasers in each embodiment of the invention are shown in Tables 1, 2, 3, 4 and 5.

A short focal length lens is positioned to focus the output of the ignitor laser into the fuel region to be ignited. Short focal lengths are generally preferred because the longer the focal length, the larger the spot size, which, for efficient operation of the invention, is limited by the minimum power density required to break down the fuel at the focal point. The focal length of this lens can be anywhere in the range from about 1 cm to about 100 cm, although for aircraft engine ignition applications, a focal length in the range from about 5 to about 30 cm is presently preferred.

If desired, a laser window can be used to protect the ignitor laser focal lens from combustion chamber products.

In the first embodiment of the invention, a single excitation light source is used to pump at least one ignitor laser located more proximately to a fuel combustion zone than the excitation light source and to sustain plasmas formed in the fuel combustion zone by application of output from the ignitor laser. An example of this embodiment of the invention is shown in FIG. 1 and detailed in Example I.

In this first embodiment of the invention, a long duration low peak power pulse of light from the excitation light source is split into two portions, with the first portion being injected into an optical fiber for transportation to the ignitor laser. The two portions into which the light beam from the excitation light source is split can be equal or unequal. When the first portion of the long duration low peak power pulse of light from the excitation light source reaches the ignitor laser, the lasing material is pumped, the Q-switch is activated, and the ignitor laser outputs a short duration high peak power pulse of light, typically from about 10 to about 20 microseconds. The short duration high peak power pulse from the ignitor laser is directed into a beam combiner.

The second portion of the beam from the excitation light source laser is directed through a fiber optic delay line long enough to delay the beam, generally from about 50 to 100 nanoseconds, then through a short focal length lens into the beam combiner where it is combined with the short duration high peak power pulse from the ignitor laser.

Other methods for introducing a temporal delay between these two pulses, including the use of reflective or diffractive multiple pass delay lines, can effectively serve the same role.

Any suitable device can be used for combining the beams including, but not limited to, beam combiners, reflective devices and optical fiber couplers.

The combined beams are then directed through a common focusing lens into a focal point in an aerosol spray or cloud of the fuel to be ignited. A common lens having a short focal length is generally preferred because of the high laser light power density achieved, although multiple focusing elements can be used effectively. For example, a 10 cm focal length lens is found to be useful for generation of an air breakdown spark by efficient contacting of the breakdown plasma with the short duration high peak power pulse from the ignitor laser as well as for sustaining of the plasma by reliable contact of the plasma with the second pulse light from the second portion of the beam from the excitation light source.

Pulse widths or temporal durations, wavelengths, peak powers and pulse energies which are generally most useful in operating the excitation light source and ignitor laser or lasers of the first embodiment of the invention are set forth in Table 1.

TABLE 1

FIRST EMBODIMENT

| Operating Feature | Broad Range | Intermediate Range | Narrow Range |
|---|---|---|---|
| Excitation Laser | | | |
| Pulse Sequence: single output pulse split into two beams | | | |
| Wavelength | 200 nm–12μ | 400 nm–5μ | 700 nm–850 nm |
| Peak Power | 100 kW–40 MW | 250 kW–12 MW | 600 kW–4 MW |
| Pulse Energy | 20 mJ–400 mJ | 50 mJ–300 mJ | 100 mJ–200 mJ |
| Pulse Width | 20 ns–200 ns | 50 mJ–175 ns | 50 ns–150 ns |
| Delay Between Pulses | 20 ns–1 μs | 25 ns–200 ns | 50 ns–150 ns |
| Ignitor Laser | | | |
| Pulse Sequence: single output pulse | | | |
| Wavelength | 200 nm–12μ | 400 nm–5μ | 800 nm–2μ |
| Peak Power | 200 kW–250 MW | 500 kW–30 MW | 1 MW–10 MW |
| Pulse Energy | 10 mJ–250 mJ | 25 mJ–150 mJ | 50 mJ–100 mJ |
| Pulse Width | 1 ns–60 ns | 5 ns–50 ns | 10 ns–30 ns |
| Delay Between Pulses | 20 ns–1 μs | 25 ns–200 ns | 50 ns–150 ns |

Figure 2:
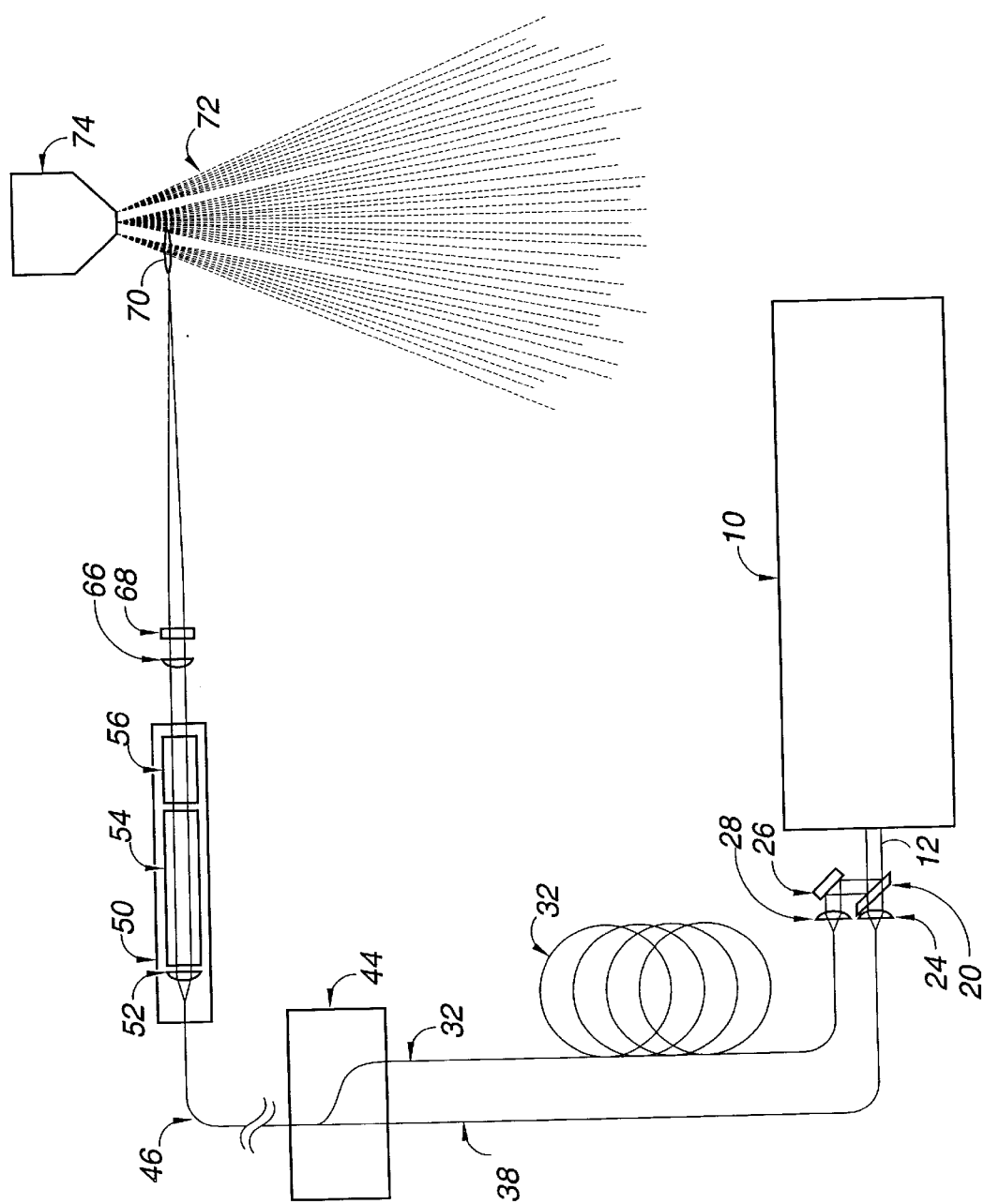
FIG. 2 is a schematic diagram of a second embodiment of the invention employing a single remote excitation laser to pump an ignitor laser with light pulses which are split into a portion that goes directly to a beam combiner and a portion that is delayed before going into the beam combiner, with the output of the beam combiner being directed into the ignitor laser.

In the second embodiment of the invention, a single excitation light source providing a long duration low peak power pulse is used to pump at least one ignitor laser with split portions of the pulse arriving at the ignitor laser at sequential intervals. An example of this embodiment of the invention is shown in FIG. 2 and detailed in Example II.

Getting the light to arrive at the ignitor laser in sequential intervals is accomplished by having a beam of light from the excitation light source split into two portions, with the first portion of the beam being transported through an optical fiber into a beam combiner. The two portions into which the light beam from the excitation light source is split can be equal or unequal.

The second portion of the beam from the excitation light source is transported to the beam combiner by an optical fiber which is longer than the optical fiber carrying the first portion of the beam and which serves as a fiber optic delay. Other means of delaying the second portion of the beam from the excitation light source such as reflective or diffractive multiple pass delay lines can be used.

After transportation through the fiber optic delay line, the second portion of the beam from the excitation light source is combined with the first portion of the beam from the excitation light source before the combined beams are directed into the ignitor laser.

Any suitable device can be used for combining the beams, including, but not limited to, beam combiners, reflective devices and optical fiber couplers.

The combined light beam from the beam combiner having a pulse of long duration low peak power light followed by a second pulse (the second portion of the split beam) of long duration low peak power light is focused into an ignitor laser located more proximately to a fuel combustion zone than the excitation light source.

In this second embodiment of the invention, the time interval between the pulses of light from the excitation light source is created by splitting the beam, delaying a portion of the beam, and then recombining the beam so that pulses of it reach the ignitor laser at intervals of time that are controlled by choice of length of the optic delay line.

As the first portion of the beam from the excitation light source reaches the ignitor is laser, the ignitor laser is activated and outputs a short duration high peak power laser light pulse. The short duration high peak power laser light pulse from the ignitor laser is focused into a focal point in an aerosol spray or cloud of combustible fuel, thereby causing breakdown and ionization of the combustible fuel to form a plasma.

Then, before the bleached Q-switch on the ignitor laser has had time to reset (typically about 1 microsecond), the second portion of the long duration low peak power beam from the excitation laser by way of the beam combiner reaches the ignitor laser and re-energizes the ignitor laser. Because the ignitor laser Q-switch is bleached and has not had time to recover, the ignitor laser simply outputs the same low power long duration pulse received from the excitation light source. This long duration low peak power pulse output from the ignitor laser is also focused into the same focal point in the aerosol spray or cloud of combustible fuel where it sustains and pumps the breakdown plasma which was created by the short duration high peak power pulse from the ignitor laser.

In other words, in the second embodiment of the invention, the two portions of the excitation laser pulses are used to sequentially Q-switch and gain switch the ignitor laser. Sequentially Q-switching and gain switching the ignitor laser produces the sequential high and low peak power pulses in the output of the ignitor laser. This sequence of alternating pulses is reiterated continuously during the entire time fuel combustion is desired.

Generally useful choices of time intervals between the pulses, pulse widths or temporal durations, pulse energies, wavelengths, and peak powers for this second embodiment of the invention are set out in Table 2.

TABLE 2

| SECOND EMBODIMENT | | | |
|---|---|---|---|
| Operating Feature | Broad Range | Intermediate Range | Narrow Range |
| Excitation Laser | | | |
| Pulse Sequence: single output pulse split into two beams | | | |
| Wavelength | 200 nm–12μ | 400 nm–5μ | 700 nm–850 nm |
| Peak Power | 100 kW–40 MW | 280 kW–12 MW | 700 kW–4 MW |
| Pulse Energy | 20 mJ–400 mJ | 50 mJ–300 mJ | 100 mJ–200 mJ |
| Pulse Width | 10 ns–200 ns | 25 ns–175 ns | 50 ns–150 ns |
| Delay Between Pulses | 20 ns–1 μs | 25 ns–200 ns | 50 ns–150 ns |
| Ignitor Laser | | | |
| Pulse Sequence: alternating first and second pulses | | | |
| Wavelength | First: 200 nm–12μ | 700 nm–12μ | 800 nm–2μ |
| | Second: 200 nm–15μ | 400 nm–12μ | 800 nm–2μ |
| Peak Power | First: 200 kW–250 MW | 500 kW–30 MW | 2.5 MW–70 MW |
| | Second: 20 kW–25 MW | 125 kW–3 MW | 400 kW–3 MW |

TABLE 2-continued

| SECOND EMBODIMENT | | | |
|---|---|---|---|
| Operating Feature | Broad Range | Intermediate Range | Narrow Range |
| Pulse Energy | First: 10 mJ–250 mJ | 25 mJ–150 mJ | 50 mJ–100 mJ |
| | Second: 10 mJ–250 mJ | 25 mJ–150 mJ | 70 mJ–150 mJ |
| Pulse Width | First: 1 ns 50 ns | 5 ns–50 ns | 10 ns–30 ns |
| | Second: 10 ns 500 ns | 50–200 ns | 50 ns–150 ns |
| Delay Between Pulses | 20 ns–1 μs | 25 ns–200 ns | 50 ns–150 ns |

Figure 3:
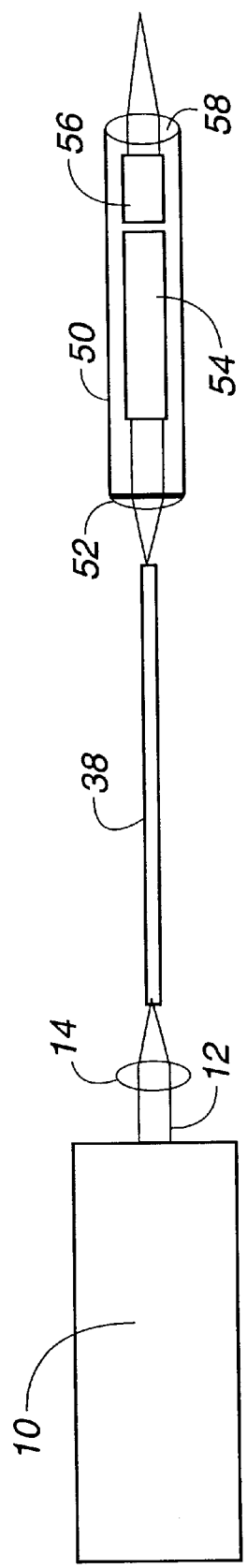
FIG. 3 is a schematic diagram of a third embodiment of the invention which operates without use of an optical delay line or splitting of the beam from the remote excitation light source.

In the third embodiment of the invention, a single excitation light source is used to pump at least one ignitor laser without use of a beam splitter, an optical delay line, or beam combiner. The excitation laser produces two laser pulses in its output. An optical fiber transports pulses of light from the excitation light source to a lens which focuses the light into an ignitor laser located more proximately to a fuel combustion zone than the excitation light source. Output from the ignitor laser is focused into a focal point in the aerosol spray or cloud of fuel. An example of this third embodiment of the invention is shown in FIG. 3 and detailed in Example III.

In this third embodiment of the invention, active modulation of the excitation light source is used to provide a time interval between the pulses of light from the excitation light source. A first long duration low peak power pulse from the excitation light source is injected into the optical fiber which transports the beam to the ignitor laser.

The first pulse of the excitation light source beam directed into the laser rod of the ignitor laser provides excitation of the ignitor laser. The ignitor laser subsequently outputs a short duration high peak power laser light pulse which breaks down and ionizes the combustible fuel in the focal point to form a plasma.

Then, before the bleached Q-switch on the ignitor laser is reset, a second long duration low peak power pulse from the excitation light source comes into the ignitor laser, causing a re-excitation of the ignitor laser rod that results in output of a long duration low peak power laser light pulse from the ignitor laser. Because the ignitor laser Q-switch is bleached and has not had time to recover, the ignitor laser simply outputs the same low peak power long duration pulse received from the excitation laser. This long duration low peak power pulse is used to directly pump and sustain the breakdown plasma produced by the high peak power, short duration output of the ignitor laser.

In other words, in the third embodiment of the invention, the two excitation laser pulses are used to sequentially Q-switch and gain switch the ignitor laser. Sequentially Q-switching and gain switching the ignitor laser produces sequential high and low peak power pulses in the output of the ignitor laser.

This sequence of alternating pulses is reiterated continuously during the entire time fuel combustion is desired.

In the third embodiment of the invention, the temporal duration or pulse width of the light from the excitation light source can be longer than the pulse widths usually used in the first and second embodiments of the invention because the time delay between pulses is adjusted by active modulation of the excitation laser rather than being set by delay line length.

The presently preferred ranges of time intervals between pulses, pulse widths, wavelengths, pulse energies and peak powers for the third embodiment of the invention are set forth in Table 3. Long duration low peak power pulses from the excitation light source are separated by a time interval in the range from about less than 1 nanosecond to about 1 microsecond. Generally presently preferred are time intervals in the range from about 50 to about 200 nanoseconds. The long duration low peak power pulses from the excitation light source can be of equal duration and power or they can be different.

TABLE 3

THIRD EMBODIMENT

| Operating Feature | Broad Range | Intermediate Range | Narrow Range |
|---|---|---|---|
| Excitation Laser | | | |
| Pulse Sequence: multiple output pulses | | | |
| Wavelength | 200 nm–12μ | 400 nm–5μ | 700 nm–850 MW |
| Peak Power | 20 kW–40 MW | 80 kW–12 MW | 250 kW–4 MW |
| Pulse Energy | 20 mJ–400 mJ | 40 mJ–300 mJ | 75 mJ–200 mJ |
| Pulse Width | 10 ns–1 ms | 25 ns–500 μs | 50 ns–300 μs |
| Delay Between Pulses | 20–1 μs | 25 ns–200 ns | 50 ns–150 ns |
| Ignitor Laser | | | |
| Pulse Sequence: alternating short and long pulses | | | |
| Wavelength | Short: 200 nm–12μ | 400 nm–5μ | 800 nm–2μ |
| | Long: 200 nm–12μ | 40 nm–5μ | 800 nm–2μ |
| Peak Power | Short: 100 kW–200 MW | 500 kW–30 MW | 2 MW–10 MW |
| | Long: 10 kW–25 MW | 50 kW–7.5 MW | 300 kW–2 MW |
| Pulse Energy | Short: 10 mJ–200 mJ | 25 mJ–150 mJ | 50 mJ–100 mJ |
| | Long: 10 mJ–250 mJ | 25 mJ-150 mJ | 50 mJ–100 mJ |
| Pulse Width | Short: 1 ns–100 ns | 5 ns–50 ns | 10 ns–30 ns |
| | Long: 10 ns–1μ | 20 ns–500 ns | 50 ns–150 ns |
| Delay Between Pulses | 20 ns–1 μs | 25 ns–200 ns | 50 ns–150 ns |

One particular fuel ignition process for which the third embodiment of the present invention is particularly suitable is achieved by application of two identical, low peak power laser pulses from an excitation laser to the lasing material of an ignitor laser. The first of the two excitation laser pulses pumps the lasing material of the ignitor laser to an inversion level which induces the formation of a short duration (typically 10 to 15 nanoseconds), high peak power pulse at the output of the ignitor laser, through a passive Q-switching process. Before the passive Q-switch can recover to a high loss state (typically 1 microsecond), the application of the second excitation pulse re-energizes the lasing medium of the ignitor laser, thereby causing the ignitor laser to lase again. This time gain-switched pulse produced by the ignitor laser has a pulse width approximating that of the excitation pulse (typically about 150 nanoseconds). In this manner the required dual laser pulse format for efficient fuel ignition is obtained. Energy provided by each ignitor laser pulse is typically about 50 to 100 mJ.

Alternatively, the excitation laser in the third embodiment of the invention can is provide two very different pulse widths. The first pulse which pumps the ignitor laser may be of very long duration (up to about 1 microsecond). After the ignitor laser has been sufficiently energized to cause the ignitor laser to Q-switch, the second excitation laser pulse with a pulse width of only about 10 to 200 nanoseconds is produced to sustain the fuel plasma generated by the output of the ignitor laser. The interval between the Q-switched pulse of the ignitor laser and the second pulse from the excitation laser is typically from about 25 to about 200 nanoseconds in this alternative.

Figure 4:
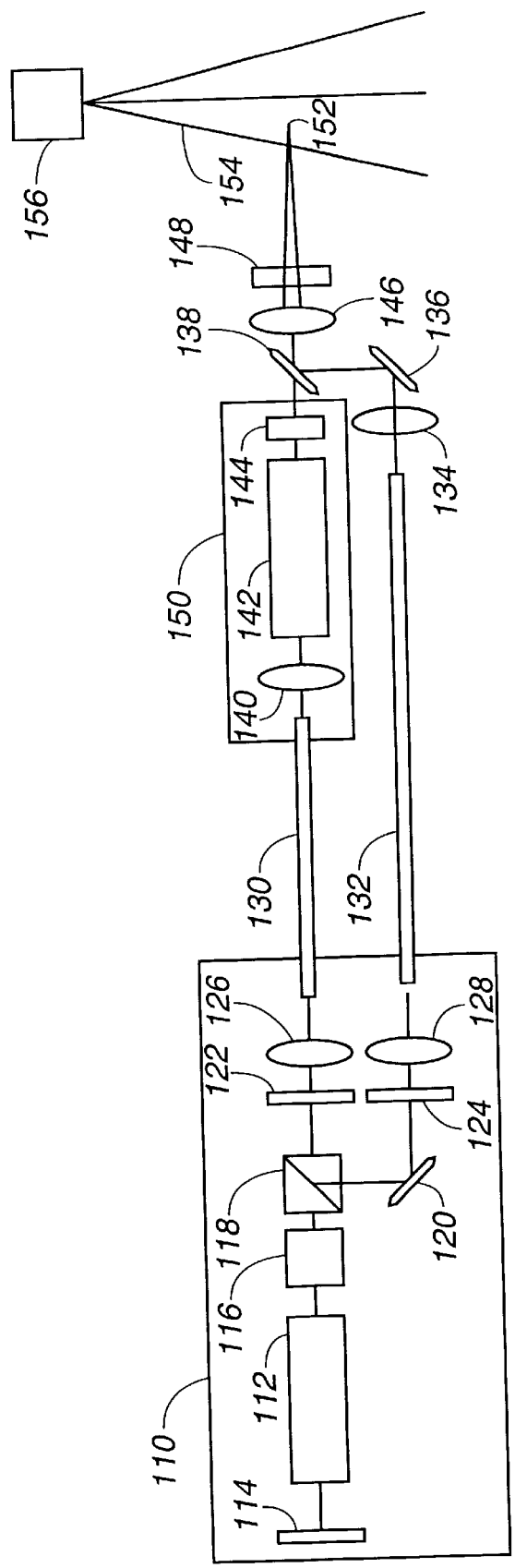
FIG. 4 is a schematic diagram of a fourth embodiment of the invention employing a remote excitation laser to provide at least two separate beams of light which are separately transported away from the excitation laser, one to an ignitor laser and another separate beam to a beam combiner where it is combined with the output from the ignitor laser.

In the fourth embodiment of the invention, two sequential laser pulses are produced by the excitation laser and transported to the ignitor laser using two optical fibers. A single excitation light source, more specifically, a laser with a plurality of resonator cavities and separate output couplers, is used to pump at least one ignitor laser located more proximately to a fuel combustion zone than the excitation laser and to sustain plasmas formed in the fuel combustion zone by application of output from the ignitor laser. An example of this embodiment of the invention is shown in FIG. 4 and detailed in Example IV.

In this fourth embodiment of the invention, light in the excitation laser produces an output of a plurality of pulses by developing light beams from each of the resonator cavities. Switching of the light path from cavity to cavity is achieved by selective reorientation of the polarization of the light in a Pockets cell or other light modulator and direction or redirection of the light with a polarization analyzer.

A common high reflecting end mirror can be used for two resonating cavities, but separate output couplers are associated with each of the resonating cavities. A birefringement filter can be used between the lasing rod of the excitation laser and the high reflecting end mirror.

When no voltage is applied to the Pockels cell, all intracavity light is directed to a first output coupler and the excitation laser output is directed into a first optical fiber for transportation to an ignitor laser. When voltage equal to the halfwave voltage (about 3500 V for $LiNO_3$) is applied to the Pockels cell, the intracavity lasing light is directed to a second output coupler and the excitation laser output is directed into a second optical fiber for transportation to a beam combiner where it is combined with the output of the ignitor laser. If the excited-state population inversion of the excitation laser rod is sufficiently high by proper choice of the first output coupler, the excitation laser will Q-switch when a voltage is quickly applied to the Pockels cell. The Q-switched pulse which results is directed to and injected into the second optical fiber.

The pulses of laser light injected into each of the separate output couplers and optical fibers can be of equal or unequal peak power, pulse energy, or pulse width.

Light injected into the first optical fiber is transported to an ignitor laser of the sort described in the first embodiments of the invention. The ignitor laser is pumped by the long duration low peak power pulse of light from the first optical fiber and outputs a short duration high peak power pulse of light which is directed into a beam combiner.

Long duration low peak power light injected into the second optical fiber is transported to the beam combiner using focusing lenses and reflecting mirrors as needed to direct the beam into the beam combiner.

Light from the ignitor laser and light from the second output coupler of the excitation laser reaches the beam combiner in sequential pulses because of the sequencing of the production of the light in the excitation laser. The pulses of light from the two sources reaching the beam combiner are spatially overlapped and co-axially propagated and directed through a short focal length lens which focuses the alternating sequence of short and long pulses of light into a focal point in an aerosol spray or cloud of fuel. The first short duration high peak power pulse from the ignitor laser breaks down and ignites the fuel. The long duration low peak power pulse from the excitation laser sustains the breakdown plasma formed by the first pulse.

The presently preferred ranges of time intervals between pulses, pulse widths, wavelengths, pulse energies and peak powers for the fourth embodiment of the invention are set forth in Table 4.

TABLE 4

FOURTH EMBODIMENT

| Operating Feature | Broad Range | Intermediate Range | Narrow Range |
|---|---|---|---|
| Excitation Laser | | | |
| Pulse Sequence: alternating first and second pulses | | | |
| Wavelength | First: 200 nm–12μ | 700 nm–2μ | 780 nm–850 nm |
| | Second: 200 bn–12μ | 700 nm–5μ | 780 nm–820 nm |
| Peak Power | First: 10 W–50 MW | 40 W–6 MW | 150 W–2.5 MW |
| | Second: 20 kW–40 MW | 100 kW–10 MW | 300 kW–6 MW |
| Pulse Energy | First: 10 mJ–500 mJ | 20 mJ–300 mJ | 50 mJ–250 mJ |
| | Second: 10 mJ–400 mJ | 20 mJ–250 mJ | 50 mJ–100 mJ |
| Pulse Width | First: 10 ns–1 ms | 50 ns–500 μs | 100 ns–300 μs |
| | Second: 10 ns–500 ns | 25 ns–200 ns | 50 ns–150 ns |
| Delay Between Pulses | 25 ns–300 ns | 50 ns–200 ns | 50 ns–150 ns |
| Ignitor Laser | | | |
| Pulse Sequence: single output pulse from one or more ignitor lasers | | | |
| Wavelength | 200 nm–12μ | 400 nm–5μ | 800 nm–2μ |
| Peak Power | 25 kW–250 MW | 100 kW–30 MW | 800 kW–10 MW |
| Pulse Energy | 5 mJ–250 mJ | 10 mJ–150 mJ | 25 mJ–100 mJ |
| Pulse Width | 1 ns–200 ns | 5 ns–100 ns | 10 ns–30 ns |

Figure 4A:
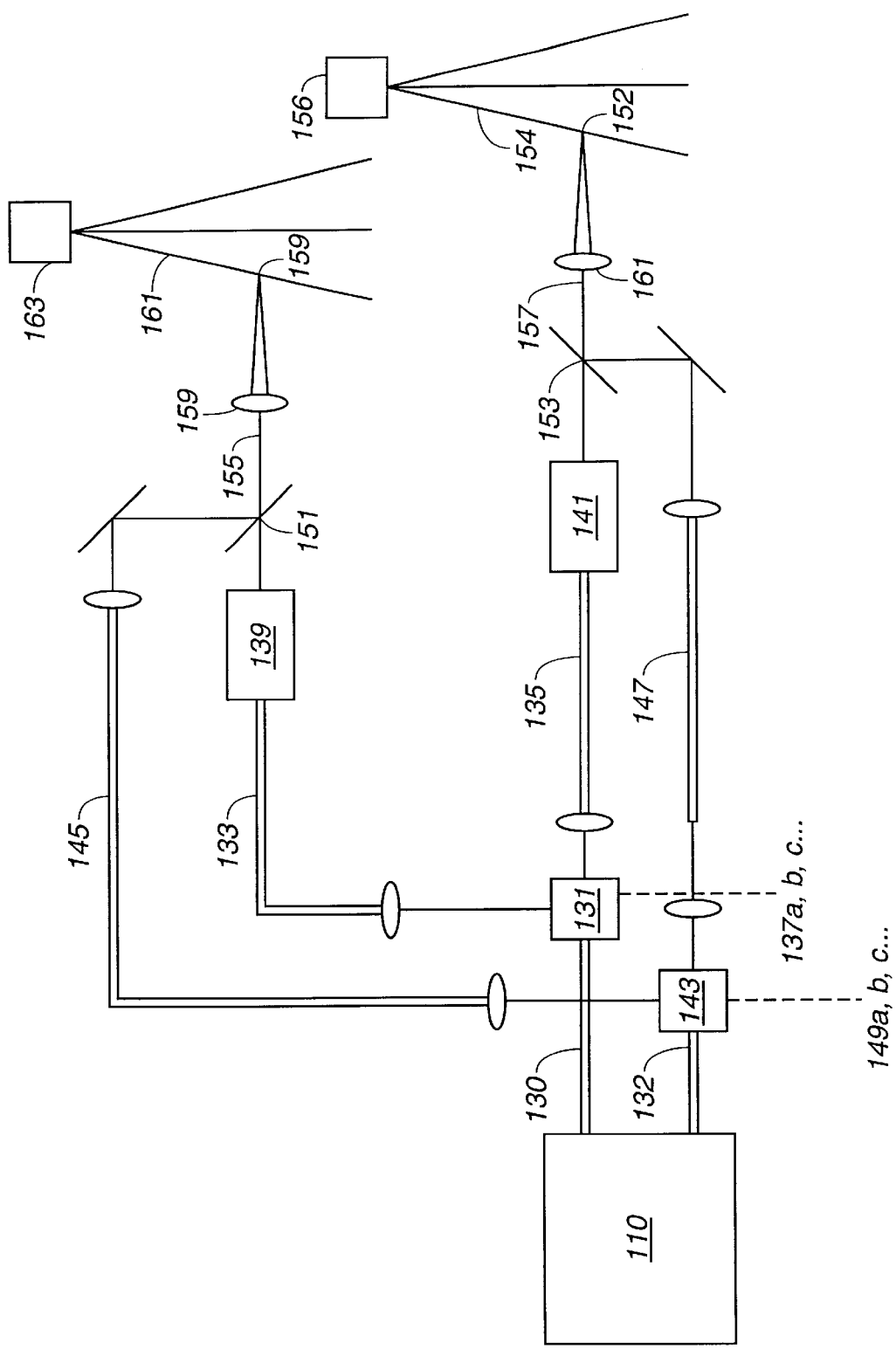
FIG. 4a is a schematic diagram of an arrangement of the fourth embodiment of the invention in which the beams are multiplexed for sequential distribution to a plurality of ignitor lasers.

The fourth embodiment of the invention can be multiplexed to direct excitation laser light to a plurality of ignitor lasers, as described in Example IV and as shown in FIG. 4a.

In an alternative to the fourth embodiment, the light redirected by the activated light modulator and polarization analyzer is directed through a halfwave plate into a second polarization analyzer where a portion of the beam is both: (a) redirected by the second polarization analyzer to the second optical fiber which delays the beam before the beam is combined with output of a first ignitor laser rod; and (b) passes through the second polarization analyzer to a second, oscillator, lasing rod within the ignitor laser.

The output of the second lasing rod in the ignitor laser is directed into the first ignitor laser rod which was activated by the long pulse duration light output from the excitation laser, such that the first laser rod functions as an amplifier. The resultant combined beam is employed as described above for the fourth embodiment of this invention for fuel ignition. An example of this alternative to the fourth embodiment is described in greater detail in Example IV and depicted in the schematic of FIG. 4b.

Figure 5:
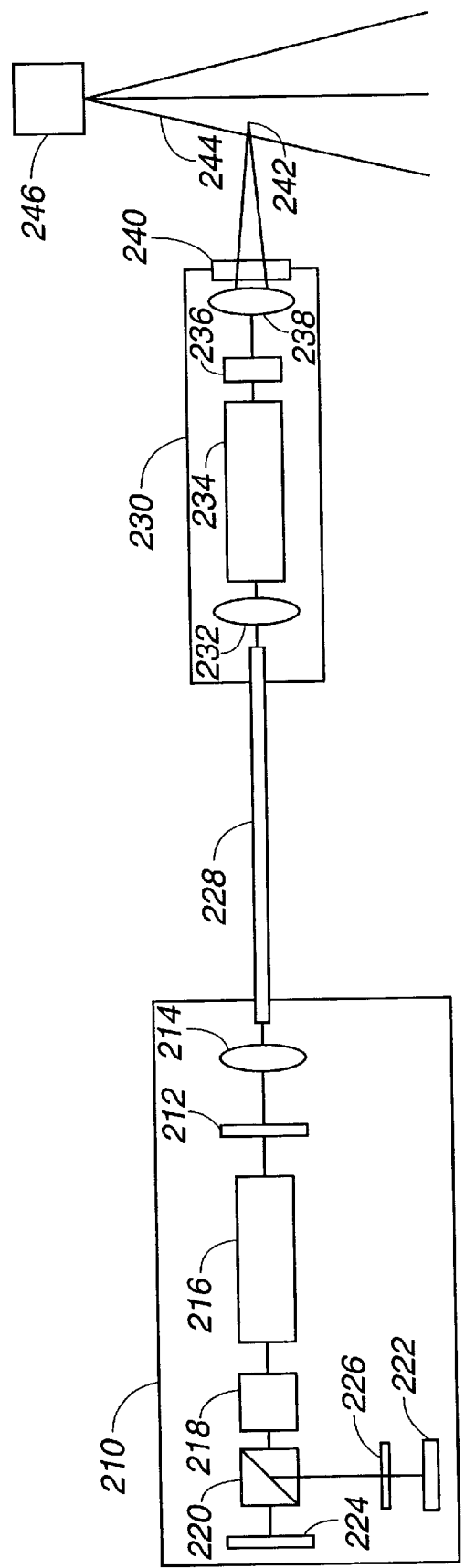
FIG. 5 is a schematic diagram of a fifth embodiment of the invention which employs a plurality of wavelengths of excitation light and operates without use of an optical delay line or splitting of the beam from the remote excitation light source.

In the fifth embodiment of the invention, a single excitation light source that can produce two laser pulses, each with a different wavelength of light, is used for: (a) excitation of at least one ignitor laser; and (b) to sustain the breakdown plasma in a focal point in an aerosol spray or cloud of combustible fuel. An example of this fifth embodiment of the invention is shown in FIG. 5, and as detailed in Example V.

In this fifth embodiment, two beams (pulses) of long duration low peak power light from the excitation light source are produced by any suitable means. A laser with an electro-optic Q-switch is presently preferred for producing the two beams by sequentially operating the laser in free-running and Q-switched modes. Active double Q-switched lasers are presently preferred as excitation light sources for the fifth embodiment of the invention. Alternatively, any other light source capable of producing alternately sequenced beams of two different wavelengths of light can be used. Also, two separate excitation light sources can be used.

A birefringement filter, Brewster plate, prism, or other wavelength selecting device can be used between the polarization analyzer and reflecting mirror as needed to fine tune the lasing wavelength.

The first pulse or beam from the excitation light source must be of a wavelength that is capable of being absorbed by the ignitor laser rod so as to pump the ignitor laser. This first pulse of long duration low peak power light from the excitation light source is injected into an optical fiber which transports the beam to the ignitor laser.

As with other embodiments of the invention, the multi-mode optical fiber may be a tapered fiber to facilitate beam alignment or a fiber bundle may be used. A multimode fiber with a core diameter of 200 microns or greater is presently preferred.

At the ignitor laser the first beam is directed into the laser rod of the ignitor laser to energize the ignitor laser. The ignitor laser then outputs a short duration high peak power Q-switched laser light pulse. Output of the short duration high peak power laser light pulse from the ignitor laser is directed through a focusing lens such as that described for the first embodiment into a focal point in an aerosol spray or cloud of fuel. At the focal point the short duration high peak power laser light pulse from the ignitor laser breaks down and ionizes the combustible fuel, forming a plasma.

The second pulse of excitation light must be of a wavelength that can be transported through the ignitor laser without absorption by the laser rod and Q-switch of the ignitor laser. Thus, the second pulse of excitation light passes unimpeded through the ignitor laser and is focused through the same lens used to focus the short duration high peak power ignitor laser output into the focal point in the aerosol spray or cloud of fuel. The long duration low peak power second pulse sustains the breakdown plasma in the combustion zone.

Pulse widths or temporal durations, wavelengths, peak powers and pulse energies which are generally most useful in operating the excitation light source and ignitor laser or lasers of the fifth embodiment of the invention are set forth in Table 5.

TABLE 5

FIFTH EMBODIMENT

| Operating Feature | Broad Range | Intermediate Range | Narrow Range |
|---|---|---|---|
| Excitation Laser | | | |
| Pulse Sequence: alternating first and second pulses | | | |
| Long Wavelength | 200 nm–12μ | 400 nm–5μ | 600 nm–2μ |
| Short Wavelength | 200 nm–12μ | 400 nm–5μ | 600 nm–2μ |
| Peak Power | First λ: 10 W–50 MW | 40 W–6 MW | 150 W–2.5 MW |
|  | Second λ: 20 kW–40 MW | 100 kW–10 MW | 300 kW–6 MW |
| Pulse Energy | First λ: 10 mJ–500 mJ | 20 mJ–300 mJ | 50 mJ–250 mJ |
|  | Second λ: 10 mJ–400 mJ | 20 mJ–250 mJ | 50 mJ–100 mJ |
| Pulse Width | First λ: 10 ns–1 ms | 50 ns–500 μs | 100 ns–300 μs |
|  | Second λ: 10 ns–500 ns | 25 ns–200 ns | 50 ns–150 ns |
| Delay Between Pulses | 25 ns–300 μs | 50 ns–200 ns | 50 ns–150 ns |
| Ignitor Laser | | | |
| Pulse Sequence: single output pulse from | | | |
| Wavelength | 200 nm–12μ | 400 nm–5μ | 800 nm–2μ |
| Peak Power | 25 kW–250 MW | 100 kW–30 MW | 800 kW–10 MW |
| Pulse Energy | 5 mJ–250 mJ | 10 mJ–150 mJ | 25 mJ–100 mJ |
| Pulse Width | 1 ms–200 ns | 5 ns–100 ns | 10 ns–30 ns |
| Delay Between Pulses | | | |

In any of the embodiments described, more than one ignitor laser can be used with a single excitation light source.

Multiple ignitor laser configurations are desirable for applications in which multiple ignitors are required, for each engine combustion chamber or where multiple combustion chambers or engines are used. The smaller, stripped down ignitor lasers can be placed proximate to the fuel jets for each of the cylinders of an aircraft engine and a single remote excitation light source used to power the smaller ignition lasers. The smaller, low-cost ignition lasers with no pumping elements such as flashlamps or diode lasers, and with no electro-optic devices, can be built to tolerate the extreme temperature variations and vibrations in the engine operating environment while the more expensive, more fragile excitation light source laser is safely positioned in the fuselage of the aircraft.

The capability of multiplexing an excitation light from the excitation light source with several different ignitor lasers reduces the cost that would be associated with having to have two excitation light sources at each of the combustion chambers of an aircraft and the cost that would be associated with maintenance of fragile, temperature sensitive and expensive excitation light sources, such as flashlamps or diode lasers in the extreme environments of combustion chambers.

To achieve this multiplexing function, an optical switching system is used to sequentially direct excitation light from the single excitation light source into multiple pairs of optical fibers, with each pair of optical fibers connected to an individual ignitor laser.

Any suitable means for optical switching can be used. Electro-optically controlled means such as that described in patent application Ser. No. 60/076,301 can be successfully employed for optical switching in the invention. Although electro-optical switching is presently preferred, various mechanical switching systems can be employed in any of the embodiments of the invention. For example, multiplexing systems based upon a rotatable prism can be utilized.

EXAMPLE I

In an example of the first embodiment of the invention, the lasers can be arranged as shown in the schematic diagram of FIG. 1. An excitation light source laser 10 having a Cr:LiSAF (chromium-doped, lithium-strontium-aluminum fluoride) rod is operated at a wavelength of 808 nanometers to produce laser light pulses with a pulse energy of about 250 mJ. The excitation light source laser 10 is pumped by either flashlamps or light emitting diodes. The excitation light source laser 10 is operated in a Q-switched mode to produce a long duration (for example, about 100 nanosecond) light pulse at the output of the laser.

The Q-switched light output from the excitation light source laser 10 is directed into a beam splitter 20. No fiber optic lines are needed between the excitation source light laser 10 and the beam splitter 20.

The output of the excitation light source laser 10 is split into at least two beams by the beam splitter 20. A first portion of the output from the excitation light source laser 10 which is split is directed through a focusing lens 24 and injected into a first optical fiber 38. In this example, 400-micron diameter multiple-mode optical fiber is used for the first optical fiber 38. The peak power density of the laser light within the multiple-mode optical fiber 38 is more than a factor of 3 below the threshold for optical damage to the fiber.

The excitation light source laser 10 is operated at sufficiently long pulse times to provide excitation energy for an ignitor laser 50 having an Nd:YAG rod 54. In this first embodiment of the invention, the two long duration pulses from the excitation light source laser 10 generally have a pulse energy of about 125 mJ and a temporal pulse length from about 50 to about 200 nanoseconds.

The first portion of the laser light from the excitation light source laser 10 coming through the first optical fiber 38 is collected and focused by a lens 52 into the Nd:YAG laser rod 54 of the ignitor laser 50. Laser light at the wavelength (808 nanometers) used in this example of the invention is strongly absorbed within the neodymium-doped YAG lasing material of the ignitor laser 50 and provides the excitation energy required for the ignitor laser 50 to operate.

A lasing condition is quickly established for the ignitor laser cavity within the 50 to 200 nanosecond duration of the light pulse that pumps the ignitor laser 50.

In this example, the mirrors for the optical resonator of the ignitor laser 50 consist of high reflectivity dielectric coatings deposited directly upon one end of the laser rod 54 (end facing the excitation light focusing lens 52) and one surface of the Q-switch 56 (surface facing the beam combiner 64). The optical coating placed upon the rod end is highly transmitting of 808 nanometer excitation light although it is highly reflecting to the 1064 nanometer lasing light produced by the ignitor laser 50. The coated end of the laser rod 54 is curved to provide a spherically reflecting cavity end mirror. The coated surface of the Q-switch 56 is optically flat so that, in combination with the spherical mirror at the laser rod end, it forms the resonant cavity within the ignitor laser 50.

The short duration, Q-switched laser pulse (generally having a duration of about 10 to 15 nanoseconds) generated by the ignitor laser 50 is provided by a passive, solid-state, saturable absorber which is contained within the resonator of the ignitor laser 50.

The pulse energy of the laser light at the output of the ignitor laser 50 is calculated to be about 50 mJ.

A second portion of the laser light from the excitation light source laser 10 which goes into the beam splitter 20 is reflected by a reflecting or turning mirror 26 which directs the beam through a lens 30 which focuses the beam into a fiber optic delay line 32. In this example, 400-micron diameter multiple-mode optical fiber is also used for the fiber optic delay line 32. The fiber optic delay line 32 is sufficiently longer than the first multiple-mode optical fiber 38 to provide a temporal delay of a number of nanoseconds in the arrival of the second portion of the output of the excitation light source laser 10 at the beam combiner 64 beyond the ignitor laser 50. For example, a delay of approximately 50 nanoseconds can usually be accomplished by having the fiber optic delay line 32 about 35 feet longer than the first multiple-mode optical fiber 38.

Laser light from the fiber optic delay line 32 is collimated using a short focal length lens 60 and then directed by way of a reflecting mirror 62 to the beam combiner 64 where it is spatially overlapped and co-axially propagated with the light output of the ignitor laser 50, although it is delayed by a number of nanoseconds relative to the output of the ignitor laser 50. Generally a delay of about 25 to about 150 nanoseconds is most useful, depending upon the properties of the fuel to be ignited.

Laser light from the beam combiner 64 having both long and short duration laser pulses from the excitation light source laser 10 and the ignitor laser 50, respectively, is then directed to a common focusing lens 66 in which both laser pulses are focused through a laser window 68 to a preselected position or focal point 70 within the fuel spray 72 from a fuel nozzle 74 in the combustion zone.

A spark breakdown plasma in the fuel spray 72 is formed by the output of the ignitor laser 50, followed by sustaining of the plasma with the long duration pulse from the second portion of the beam from the excitation light source laser 10. Thus, an effective dual pulse of laser light within the temporal format needed to achieve optimal fuel ignition performance is provided.

EXAMPLE II

In an example of the second embodiment of the invention, the manner in which the ignitor laser is pumped is altered to produce two sequential pulses which conform to the selected dual pulse fuel ignition format, thus eliminating the need for a beam combiner between the small ignitor laser and the combustion zone. The portions of the beam from the excitation light source are combined before transportation to the ignitor laser.

In this second embodiment, shown in the schematic of FIG. 2, the excitation light 12 from the excitation laser light source 10 is split into two beams by a beam splitter 20. A first portion of the laser light is focused by a lens 24 and injected into a first multiple-mode optical fiber 38. A second portion of the excitation light from the beam splitter 20 is reflected by a mirror 26 and focused into a lens 28 into a fiber optic delay line 32. As described in Example I of the first embodiment of the invention, the fiber optic delay line 32 is longer than the first multiple-mode optical fiber 38 in order to provide a temporal delay in the delivery of the second portion of the excitation light.

In this second embodiment shown in FIG. 2, the light output of the two optical fibers 38 and 32 is combined using an optical fiber coupler 44 which combines both beams. The combined beam is injected into a single fiber 46 which carries the two excitation light pulses through a focusing lens 52 to the ignitor laser rod 54. The ignitor laser 50 is in the same configuration as that described in Example I.

The first excitation pulse quickly establishes a lasing condition in the laser rod 54 which results in the formation of a short duration pulse (generally from about 10 to about 20 nanoseconds) in the output of the ignitor laser 50 by the action of the saturable absorber Q-switch 56. Before the bleached Q-switch can recover or reset, the arrival of the second excitation pulse re-establishes a lasing condition in the laser rod 54 which results in the formation of a gain-switched light pulse in the output of the ignitor laser 50. The pulse width of the gain-switched pulse is approximately equal to that of the excitation pulse (generally about 100 nanoseconds). In this manner, two sequential laser pulses with high and low peak powers are generated and separated in time by the temporal delay between the excitation pulses. Both laser pulses from the ignitor laser 50 are focused within the fuel by a common lens 66.

EXAMPLE III

An example of the third embodiment of the invention is shown in FIG. 3.

In this example of the third embodiment of the invention, the excitation laser 10 is operated to produce two sequential, low peak power pulses. A Cr:LiSAF laser as described in Example I is used as the excitation light source 10.

The two pulses are produced by Q-switching the excitation laser 10 twice within a time frame from about 50 nanoseconds to about 1 microsecond. The provision of the two sequenced pulses separated by a time interval from the excitation laser 10 eliminates the need for an optical delay line or beam splitters or beam combiners.

The temporal length of the two pulses is typically from about 50 to about 200 nanoseconds. The length of the two pulses can be the same or different. The time interval between the two pulses is typically from about 25 to about 2000 nanoseconds.

An excitation laser peak power of less than about 200 MW/cm$^2$ was used.

The light pulses 12 from the excitation light source laser 10 are focused through a short focal length lens 14 into a single multiple-mode optical fiber 38 with a core diameter of about 400 microns and with a taper at the input end. The multiple-mode optical fiber transports both excitation laser light pulses sequentially to the ignitor laser 50.

The configuration of the ignitor laser 50 is the same as that described in Example I.

The transported laser light output of the optical fiber 38 is focused through another lens 52 into the laser rod 54 of the ignitor laser 50. Any suitable lens capable of uniformly illuminating nearly the full diameter of the input end of the laser rod 54 of the ignitor laser 50 can be used for this second lens 52. The second lens 52 may be a conventional short focal length lens or may be a graded refractive index type lens.

The first excitation light pulse arriving in the ignitor laser 50 causes ignitor laser output of a short duration high peak power pulse, as described in operation of the ignitor laser in Examples I and II. The second excitation light pulse arriving in the ignitor laser causes output of a long duration low peak power pulse from the ignitor laser 50.

The alternating sequence of laser light output of the ignitor laser 50 is then focused through a third lens 58 into the selected location in the fuel spray 72.

19

EXAMPLE IV

In an example of the fourth embodiment of the invention, the lasers can be arranged as shown in the schematic diagram of FIG. 4. An excitation laser 110 having a Cr:LiSAF rod 112, high reflection end mirror 114 which is highly reflective of 808 nm wavelength light, a Pockels cell 116, a polarization analyzer 118, a reflecting mirror 120, two output couplers 122 and 124, and two output focusing lenses 126 and 128, was used to produce a dual pulse format.

The excitation laser 110 is pumped by either flashlamps or light emitting diodes. The excitation laser 110 is operated at a wavelength of 808 nanometers to produce laser light pulses with a pulse energy of about 250 mJ. Typical pulse widths for the first pulse from the excitation laser 110 is in the range from about 200 ns to about 300 microseconds.

A first excitation light pulse is produced by having all intracavity light directed to the first output coupler 122 by not activating the Pockels cell 116 and allowing the light to pass unimpeded through the polarization analyzer 118. The first pulse of light passing through the polarization analyzer 118 and first output coupler 122 is focused by a first output focusing lens 126 into a first optical fiber 130.

In this example, 400-micron diameter multiple-mode optical fiber is used for all optical fibers.

A second excitation light pulse is produced by applying voltage equal to the halfwave voltage (about 3500 V) to the Pockels cell 116, thereby changing the polarization of the light. The re-polarized light is rejected by the polarization analyzer 118 and redirected by a reflecting mirror 120 through the second output coupler 124 into the second focusing lens 128. The second focusing lens 128 focuses the second light pulse into the second optical fiber 132, which transports the second light pulse to a beam combiner 138 where it is combined with output of the ignitor laser 150. In this example an additional short focal length lens 134 and reflecting mirror 136 are used to collimate and direct the second light pulse to the beam combiner 138.

The pulse width of the second excitation laser pulse is typically from about 50 to about 200 ns.

A Nd:YAG laser 150, having an input focusing lens 140, neodymium-doped YAG laser rod 142 and passive Q-switch 144 as described in the first embodiment of the invention in Example I is used as the ignitor laser.

The first pulse of light from the excitation laser 110 is transported through the first optical fiber 130 into the ignitor laser 150, causing output of a short duration high peak power pulse. Generally the ignitor laser output had a duration about 10 to 30 nanoseconds and a calculated pulse energy of about 50 mJ.

The combined output of the ignitor laser 150 and the second pulse of light from the excitation laser 110 are directed into a short focal length lens 146 and focused through a laser window 148 into a focal point 152 within the fuel spray 154 from a fuel nozzle 156 in the combustion zone.

A spark breakdown plasma in the fuel spray 154 is formed by the output of the ignitor laser 110 followed by sustaining of the plasma with the long duration second pulse from the excitation laser 110. Thus, an effective dual pulse of laser light within the temporal format needed to achieve optimal fuel ignition performance is provided.

FIG. 4a is a schematic of an arrangement of the fourth embodiment of the invention in which the beams are multiplexed for sequential distribution to a plurality of ignitor lasers. When a multiplexed beam is to be used for directing light sequentially to a plurality of ignitor lasers from a single excitation light source, the apparatus can be set up as shown in the schematic of FIG. 4a. An excitation laser 110 is configured as described in FIG. 4 is used to produce a dual pulse format. The first excitation output beam 130 is directed into a first multiplexer 131 which directs output through a plurality of optical fibers 133, 135, 137a, b, c . . . into a plurality of ignitor lasers 139, 141, . . . The second excitation output beam 132 is directed into a second multiplexer 143 which directs output through a plurality of optical fibers 145, 147, 149a, b, c . . . into a plurality of beam combiners 151, 153, and so forth, where each of the outputs is combined with the outputs of the plurality of ignitor lasers 139, 141, . . .

The combined beams 155, 157, . . . are directed through focusing lenses 159, 161 . . . into focal points 152, 159, . . . in fuel sprays 154, 161, . . . from fuel nozzles 156, 163, . . .

Figure 4B:
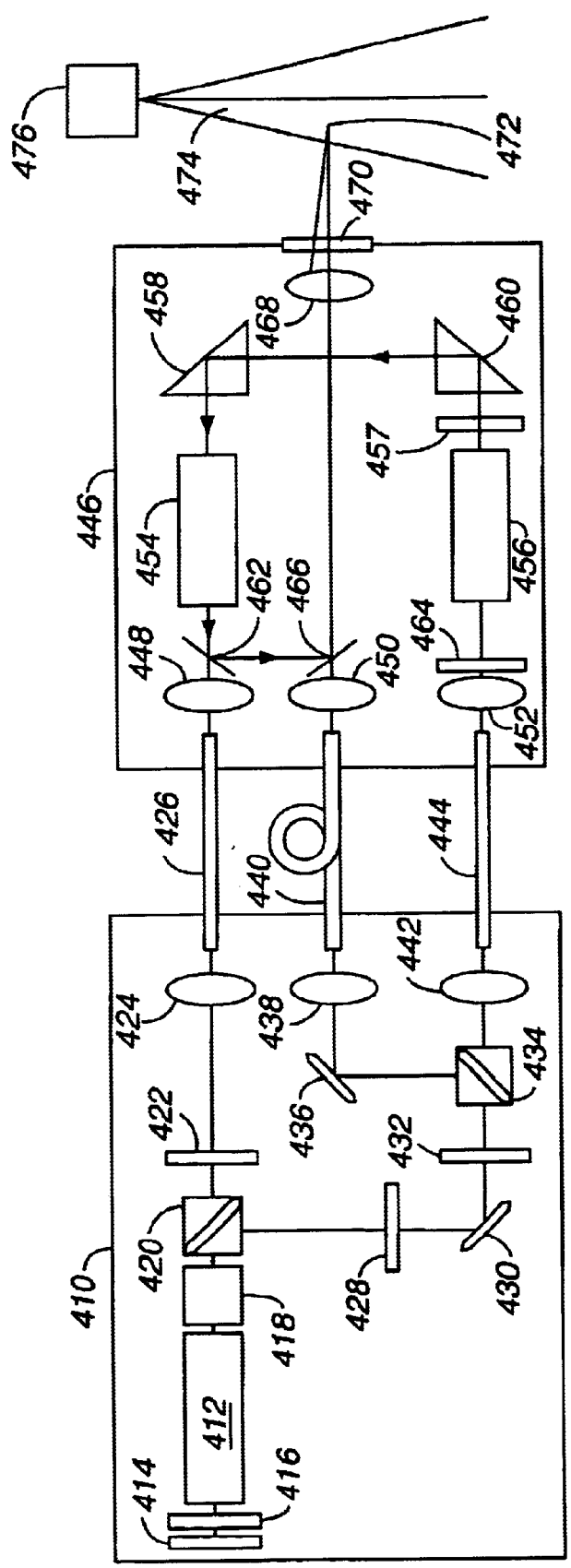
FIG. 4b is a schematic diagram of an arrangement of the fourth embodiment of the invention in which pulsed beams from a single excitation laser are split, then a portion of the split beam is split once again, providing portions of the beam for delay, oscillation, and amplification before combination of the portions of the beam for direction into a single fuel ignition point in an aerosol fuel spray or cloud.

FIG. 4b is a schematic of another arrangement of the fourth embodiment of the invention in which one of the two outputs occuring at output couplers of an excitation laser is split into two parts. In this manner, three outputs are obtained from the excitation laser; two are used to energize an oscillator and amplifier of an ignitor laser, and the third is used to mix with the output of the ignitor laser to energize a fuel igniting laser breakdown spark.

The excitation laser 410 had a Cr:LiSAF rod 412, an 820 nm high reflecting end mirror 414, a birefringement filter 416 to tune the output of the excitation laser to a wavelength of 820 nm, and two partially reflecting output coupling mirrors 422 and 428. A Pockels cell 418 was positioned between the excitation laser rod 412 and a first polarization analyzer 420 to allow Q-switching of the excitation laser 410.

The excitation laser 410 was pumped by either flashlamps or light emitting diodes. Pumping the excitation laser 410 produces long pulse duration laser light at a wavelength of 820 nm at a first output coupler 422. All laser light from the excitation laser is passed through the first polarization analyzer 420. Typical pulse widths for the first pulse from the excitation laser 410 were 30 ns to about 300 ns. This first pulse from the excitation laser 410 is immediately injected into a first optical fiber 426 when long pulse light is focused by lens 424.

In this example shown in FIG. 4b, 600-micron diameter multiple-mode optical fiber was used for all optical fibers.

A second, Q-switched excitation light pulse, with a shorter pulse duration typically less than 100 ns FWHM, was produced by applying voltage equal to the halfwave voltage (about 3500 V) to the Pockels cell 418, thereby changing the polarization of the light passing through the Pockels cell 418. The intraresonator light of the excitation laser incident upon the polarization analyzer 422 was rejected and directed to a second output coupler 428.

Q-switched laser output through the second output coupler 428 was directed by a first reflecting mirror 430 to a halfwave plate 432. Rotation of the halfwave plate 432 was used to deliver selected portions of differently polarized light to a second polarization analyzer 434. The combination of the half-wave plate 432 and the second polarization analyzer 434 acted as a variable beam splitter. The rotation of the halfwave plate 432 was adjusted so that 50% of the Q-switched pulse energy was rejected by the second polarization analyzer 434 and 50% was transmitted through the second polarization analyzer 434.

The rejected half (first portion) of the second excitation light pulse from the second polarization analyzer 434 was directed by a turning mirror 436 through a second focusing lens 438 into a second optical fiber 440, which was longer than the first optical fiber 426.

A second portion of the second excitation light pulse passed unimpeded through the second polarization analyzer 434, was focused by a third focusing lens 442 into a third optical fiber 444.

The ignitor laser used in this example, as shown in FIG. 4b, was a Nd:YAG laser 446, with three ignitor input focusing lenses 448, 450 and 452, two neodymium-doped YAG laser rods 454 and 456, two turning prisms 458 and 460, and three dichroic reflecting mirrors 462, 464 and 466. The first ignitor laser rod 454 and reflecting mirrors 464 and 466 formed a gain-switched oscillator which produced a short duration (less than 5 ns) laser pulse when the second ignitor laser rod 456 was energized by the Q-switched pulse from the excitation laser 410. The first ignitor laser rod 454 functioned as an amplifier to increase the energy of the oscillator output.

Portions of excitation light energy from the excitation laser 410 were focused into the ignitor laser 446 through each of the first, second and third optical fibers 426, 440, and 444 in the following manner.

The first pulse of light from the excitation laser 410 was transported through the first optical fiber 426 into the ignitor laser 446, through the first ignitor laser input focusing lens 448, and into the first (amplifier) ignitor rod 454 to energize the first (amplifier) ignitor rod 454 of the ignitor laser 446.

The second optical fiber 440 transported the first portion of the second excitation light pulse from the second polarization analyzer 434 through the second ignitor input focusing lens 450 to a dichroic beam combiner 466 where it was combined with output of the first (amplifier) ignitor rod 454 of the ignitor laser 446. The second ignitor input lens 450 was used to collimate the output of the second optical fiber 440.

The first portion of the second excitation light pulse transported through the second optical fiber 440 was used to energize and sustain the air breakdown plasma produced by the focused output of the ignitor laser 446. The second optical fiber 440 was about 12 m longer than the first and third optical fibers 426 and 444 to produce a temporal delay of 30 to 60 ns in the output of the second optical fiber 440. The longer optical fiber length was required to properly temporally sequence the application of breakdown sustaining light energy to the focal point 472 for optimal results.

The second half of the second excitation light pulse being transported by the third optical fiber 444 was focused through the third ignitor laser input focusing lens 452 and through the second dichroic reflector 464 into the second (oscillator) ignitor laser rod 456 to energize the second (oscillator) ignitor laser rod 456.

A short duration, gain switched pulse was produced at the output coupler 457 of the second (oscillator) ignitor laser rod 456 of the ignitor laser 446. Energy and duration of the oscillator output beams were typically 30 mJ and 4 ns, respectively. The oscillator output was then directed by turning prisms 460 and 458 into the first (amplifier) ignitor laser rod 454. The output of the first (amplifier) ignitor laser rod 454 (110 mJ in a 4 ns pulse) was then directed by dichroic reflecting mirror 462 into dichroic beam combiner 466 where it was combined with first portion of the second excitation light pulse transported through the second optical fiber 440 before direction to the ignitor laser output focusing lens 468.

Still with reference to FIG. 4b, the combined output of the ignitor laser rods 454 and 456 and the first pulse of light from the excitation laser 410 through the second optical fiber 440 was directed into a short focal length lens 468 and focused through a laser window 470 into a focal point 472 within the fuel spray 474 from a fuel nozzle 476 in the combustion zone.

Although combined with the amplified output of the first (amplifier) ignition laser rod 454, the first portion of the second excitation light pulse arrived at the ignitor laser output lens 468 after the second portion of the second excitation light pulse combined with the output of the first (amplifier) ignitor laser rod 454, thus becoming the second pulse of light energy to be directed into the focal point where it functioned to sustain ignition achieved by application of the first short high energy pulse to reach the focal point. Thus, an effective dual pulse of laser light within the temporal format needed to achieve optimal fuel ignition performance is provided.

EXAMPLE V

An example of the fifth embodiment of the invention is shown in the schematic diagram in FIG. 5. In this example of the invention, the excitation laser is operated to produce two sequential low peak power pulses having two different wavelengths.

Wavelengths of 808 nanometers and 850 nanometers were selected because the Nd:YAG rod of the ignitor laser will absorb the 808 nm wavelength and will not absorb the 850 nm wavelength light.

In the excitation laser 210 for this embodiment, an output coupler 212 is positioned between the output focusing lens 214 and the laser rod 216. A Pockels cell 218 is positioned to receive light from the laser rod 216 and direct the light from the laser rod 216 into a polarization analyzer 220.

The excitation laser 210 contains two end mirrors 222, 224 that are dielectric coated so as to select the particular wavelength at which the excitation laser will operate. End mirror 222 is coated for high reflectivity at 808 nanometers; end mirror 224 is coated for high reflectivity at 850 nanometers.

The mirror reflecting light employed at any given time is determined by the voltage applied to the Pockels cell 218. When no voltage is applied to the Pockels cell 218, the polarization of the light is unchanged and all the laser light is directed to end mirror 222 through the polarization analyzer 220 to laser rod 216. Output of laser rod 116 goes to an output coupler 212, thusly producing laser output with a wavelength of 808 nm. The output coupler 212 is a broad-band reflector with a reflectivity in the range from about 30% to about 70%.

A brewster plate 226, birefringement filter, or other wavelength tuning element can be positioned between the polarization analyzer 220 and the reflecting end mirror 222 to fine tune the lasing wavelength.

Typically, the excitation laser 210 outputs a first pulse with a duration of about 50 nanoseconds to about 300 microseconds at the selected 808 nm wavelength. Typical peak power for the first excitation laser pulse is from about 1 kW to about 1 MW.

Once the ignitor laser 230 has been fully energized by the first light pulse and the ignitor laser 230 has Q-switched, voltage is quickly applied to the Pockels cell 218. The magnitude of this voltage generally is equal to the voltage of the Pockels cell 218, i.e., a halfwave voltage of about 3,500 V. When the halfwave voltage is applied to the Pockels cell 218, the polarization of the light is changed by 90°. The polarization analyzer 220 will direct all the light of the second pulse to end mirror 224 and a Q-switched pulse with a wavelength of 850 nm and a duration in the range from about 50 to about 200 ns is produced by the excitation laser. Typical peak power for the second excitation laser pulse is from about 100 kW to about 10 MW.

The light pulses from the excitation light source laser 210 are focused through a short focal length lens 214 into a single multiple-mode optical fiber 228 a core diameter of about 400 microns and with a taper at the input end. The multiple-mode optical fiber 228 transports both excitation laser light pulses sequentially to the ignitor laser 230.

The configuration of the ignitor laser 230 is the same as that described in Example I. Light from the optical fiber 228 is focused into the ignitor laser 230 through a lens 232 into the ignitor laser rod 234 and thence to the passive Q-switch 236 of the ignitor laser 230.

The first 808 nm wavelength pulse from the excitation light laser 210 is absorbed by the ignitor laser rod 234 and energizes the ignitor laser 230, thereby producing a short duration high peak power pulse of laser light. The short duration high peak power pulse from the ignitor laser 230 is focused through a focusing lens 238, then through a laser window 240 to a preselected position or focal point 242 within the fuel spray 244 from a fuel nozzle 246 in the combustion zone. A breakdown plasma is produced at the focal point 242 by the first 808 nm wavelength pulse of light.

The interval between the end of the first pulse and the start of the second pulse is typically from about 50 to about 200 ns.

After the selected interval between the two pulses, the second 850 nm wavelength pulse from the excitation light laser 210 is similarly transported to the ignitor laser 230. However, since the 850 nm wavelength of the second pulse of light is not within the absorption band of either the laser rod 234 or Q-switch 236, the collimated light of the second pulse passes unimpeded through each of the ignitor laser components. The lens 238 focuses the 850 nm wavelength light which has passed through the ignitor laser 230 and through the laser window 240 to the focal point 242 within the fuel spray 244 from the fuel nozzle 246 in the combustion zone. This second long duration low peak power pulse sustains the ignition of the fuel/air plasma induced earlier by the short duration high peak power pulse from the ignitor laser 230.

EXAMPLE VI

Figure 6:
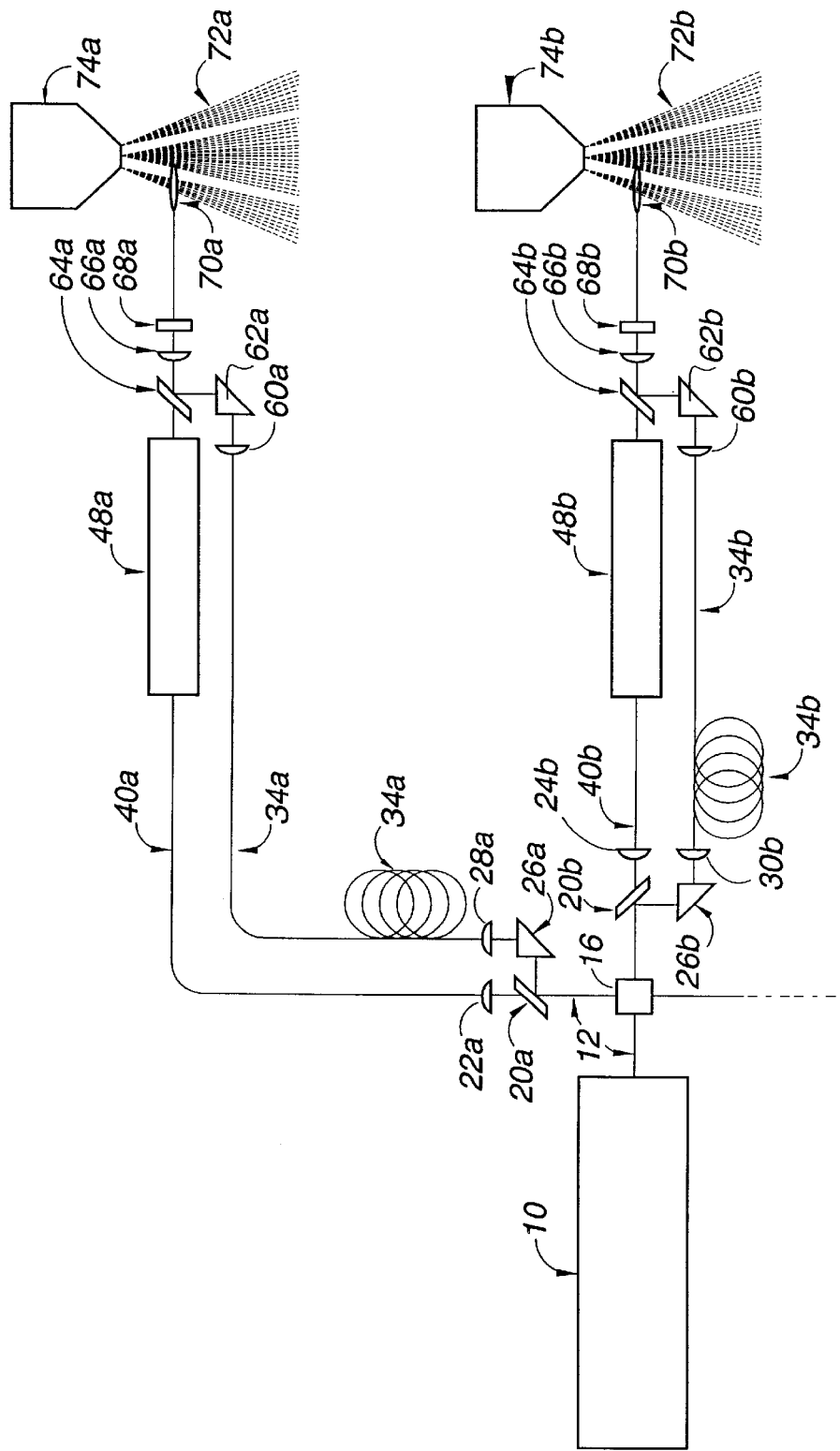
FIG. 6 is a schematic diagram of a multiplexed laser ignition system in accordance with the invention.

A schematic of a mechanically multiplexed arrangement of the ignition lasers in a sixth embodiment of the invention is shown in FIG. 6. As depicted in FIG. 6, a single excitation light source laser 10 is used to provide low peak power long duration light pulse energy for several ignitor lasers 48a, 48b, . . . The excitation laser light 12 is directed into a beam multiplexer 16 or other means for optical switching of the excitation laser light beam 12 in random or ordered sequence from one pair of optical fibers 34a and 40a to another 34b and 40b, and to as many other pairs of optical fibers as are used.

The laser light is transported by each of the pairs of optical fibers to an ignitor laser 48a, 48b, . . . and a beam combiner 64a, 64b, . . . and thence through an additional lens 66a, 66b, . . . into the focal point 70a, 70b, . . . in a fuel spray 72a, 72b, . . . as would be used with the first embodiment of the invention and shown in FIG. 6. Alternatively, the laser light transported by each pair of optical fibers is directed into a beam combiner before injection into the ignitor laser associated with each of the pairs of optical fibers, as would be used with the second embodiment of the invention shown in FIG. 2.

EXAMPLE VII

Figure 7B:
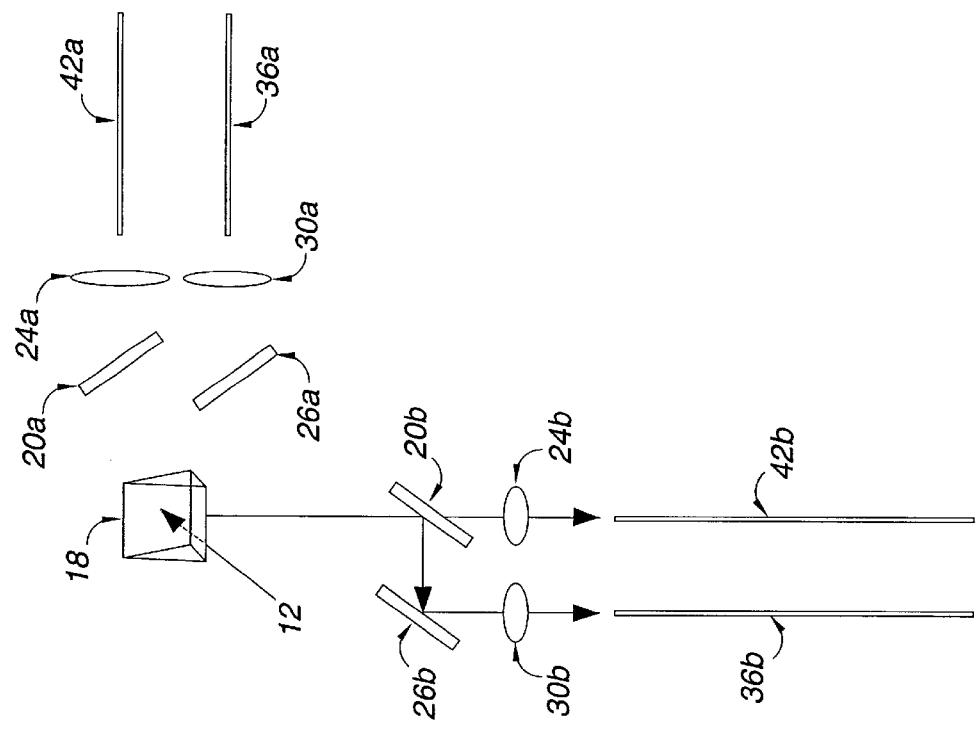
FIGS. 7a and 7b are schematic diagrams of two steps of the sequential operation of an optical switching system such as one which can be used in the embodiment of the invention shown in FIG. 6.
Figure 7A:
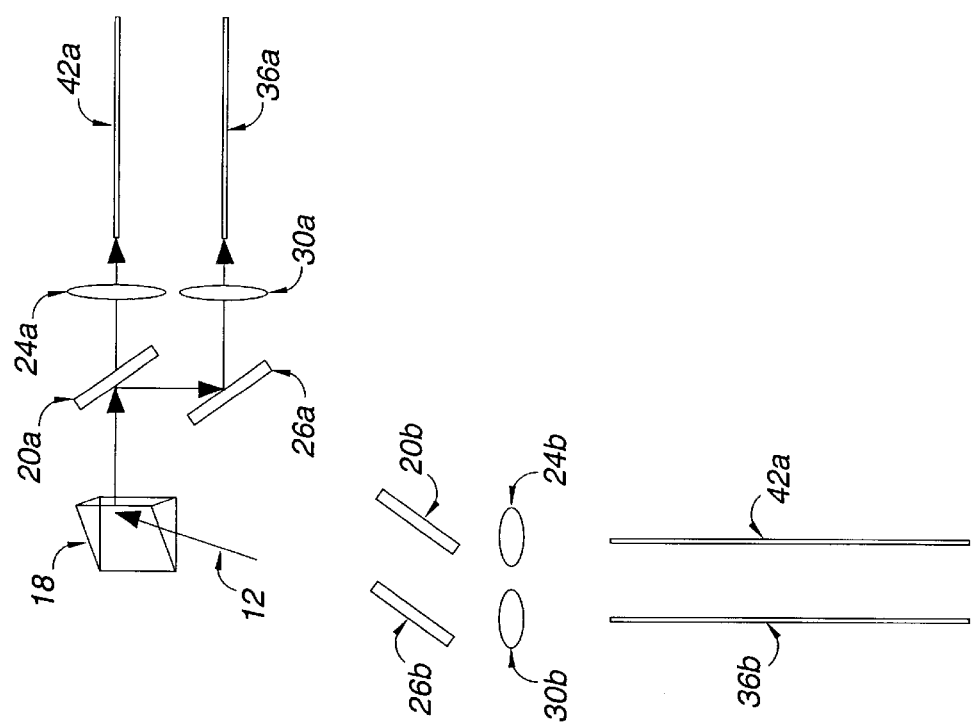

A presently preferred simple and economical optical switch which can be used in the multiplexed embodiment of the invention described in Example VI is based upon a rotatable 90-degree prism 18 as shown in FIGS. 7a and 7b.

With reference to FIG. 7a, excitation light 12 is directed into the lower (bottom) face of the prism 18 where the excitation light is reflected through a 90° angle. Excitation light exiting the prism 18 is then directed to a beam splitter 20a where the excitation laser light is split into two equal intensity beams. The two beams are then focused through lenses 24a and 30a, and injected into two optic fibers 36a and 42a, one of which transports laser light directly to the ignitor laser and the second of which is an optical delay line. The optical fibers 36a and 42a transport the excitation light to a first single ignitor laser in a manner substantially identical to that described for either the first or second embodiment of the invention, each of which has a first multiple-mode optical fiber and a fiber optic delay line transporting excitation light in sequential pulses to an ignitor laser.

With reference to FIG. 7b, to excite a second ignitor laser, the same prism 18 is rotated to another angular position so that the excitation light is directed to a second beam splitter 20b which then directs excitation light to a second pair of optical fibers 36b and 42b that transport excitation light to the second ignitor laser.

Likewise, third, fourth, and more ignitor lasers can be powered by the single excitation laser light source 10, by rotating the prism 18 through more angles to direct laser light through other beam splitters into other pairs of optical fibers that take sequential pulses of laser light to each of the other ignitor lasers in sequential turns. In this manner, numerous remotely located ignitor lasers can be energized sequentially by a single excitation light source.

EXAMPLE VIII

In another alternative device and method analagous to that shown in FIG. 3, similar switching action can be performed in an apparatus using only a single excitation light source, a single multiple-mode optical fiber and no fiber optic delay line. Only one optical fiber is used to link the excitation source with each of the ignitor lasers. A multiplexing device is used to direct light from the excitation light source sequentially into the optical fiber associated with each of the ignitor lasers.

In each of the embodiments of the invention, the small physical size and simplicity of design of the ignitor laser enables an effective, compact, robust and cost effective laser ignitor package which is about the same size as the spark plug which it replaces in various combustion applications.

The multiplexed embodiments of the invention are particularly useful for aerospace fuel ignition applications. The laser ignition hardware of this invention is suitable for use in harsh aerospace operating environments because it is compact, insensitive to engine vibrations, and is able to withstand extreme temperature variations. There is no need to provide bulky and fragile excitation sources such as flash lamps or light emitting diodes at the ignitor laser proximate to the ignition site. Instead, bulky and fragile excitation sources are located at the excitation light source, which can be located within the aircraft cabin or other remote location away from the propulsion engine. The reduced size of the ignition equipment at the engine reduces cooling requirements and reduces sensitivity to both vibrations and temperature.

No electrical connections of any kind are required to operate the invention apparatuses. Therefore, problems with high voltage containment at the engine, which are experienced with the failure of conventional capacitive discharge type ignitors (spark plugs) are eliminated.

Because the ignitor lasers are basically monolithic units with no need for excitation sources such as flash lamps or light emitting diodes, virtually all maintenance is confined to the single excitation light source which can be placed in an easily accessible location. Since the excitation light source is located remotely from the ignition site, its environment can be more stringently controlled and the size of the excitation light source is less likely to be problematic.

While the apparatuses and methods of this invention have been described in detail for the purpose of illustration, the inventive apparatuses and methods are not to be construed as limited thereby. This patent is intended to cover all changes and modifications within the spirit and scope thereof.

INDUSTRIAL APPLICABILITY

The apparatus and method of the invention can be used as an ignition source for turbojet engines, internal combustion engines, diesel engines and gas turbines for electrical power generation.

What is claimed is:

1. An ignition apparatus comprising:
   (a) an excitation light source;
   (b) a light modulator positioned to receive output from said excitation light source;
   (c) a first polarization analyzer positioned to receive light from said light modulator;
   (d) a first output coupler positioned to receive a portion of light not redirected by said first polarization analyzer;
   (e) a focusing lens positioned to inject said portion of light not redirected by said first polarization analyzer from said first output coupler into a first end of a first optical fiber;
   (f) a second end of said first optical fiber connected to an ignitor laser so as to permit transport of said portion of light not redirected by said first polarization analyzer into a first lasing rod in said ignitor laser;
   (g) a second output coupler positioned to receive a portion of light redirected by said first polarization analyzer;
   (h) a halfwave plate positioned to receive from said second output coupler said portion of light redirected by said first polarization analyzer;
   (i) a second polarization analyzer positioned to receive output from said halfwave plate;
   (j) a second focusing lens positioned to inject light redirected by said second polarization analyzer into a first end of a second optical fiber;
   (k) a second end of said second optical fiber connected to said ignitor laser so as to permit transport of said portion of light redirected by said first polarization analyzer into a beam combiner in said ignitor laser;
   (l) a third focusing lens positioned to inject a portion of light not redirected by said second polarization analyzer into a first end of a third optical fiber;
   (m) a second end of said third optical fiber connected to said ignitor laser so as to permit transport of said portion of light not redirected by said second polarization analyzer into a second lasing rod in said ignitor laser;
   (n) an output coupler positioned to receive output from said second lasing rod in said ignitor laser;
   (o) at least one turning prism to direct said output from said second lasing rod in said ignitor laser into said first lasing rod in said ignitor laser;
   (p) said beam combiner also positioned to receive output from said first lasing rod in said ignitor laser; and
   (q) an ignitor output focusing lens positioned to direct output from said beam combiner into a combustible fuel.

2. The apparatus recited in claim 1 wherein said excitation light source is remote from said ignitor laser.

3. The apparatus recited in claim 1 wherein said second optical fiber is longer than said first optical fiber and longer than said third optical fiber.

4. The apparatus recited in claim 1 wherein said excitation light source is a laser with at least two resonator cavities.

5. The apparatus recited in claim 4 wherein said laser is a Q-switched laser tunable over a wavelength range from abut 800 to about 1000 nanometers.

6. The apparatus recited in claim 1 wherein said excitation light source is a Q-switched Cr:LiSAF laser and said ignitor laser is a Nd:YAG laser.

7. The apparatus recited in claim 4 further comprising a high reflecting end mirror positioned proximate to an end of said laser opposite an output end of said laser.

8. The apparatus recited in claim 1 wherein said light modulator is a Pockels cell.

9. The apparatus recited in claim 7 further comprising a birefringment filter between said high reflecting end mirror and said end of said laser opposite said output end of said laser.

10. The apparatus recited in claim 1 wherein said beam combiner is an optical fiber coupler.

11. The apparatus recited in claim 1 wherein said ignitor laser is proximate to fuel in an engine combustion chamber.

12. The apparatus recited in claim 1 wherein said ignitor laser is proximate to fuel in the cylinder of an aircraft engine.

13. The apparatus recited in claim 1 wherein said ignitor laser is proximate to fuel in a turbine engine.

14. An ignition method comprising:
   (a) directing a beam from an excitation light source into a laser light modulator;
   (b) applying a voltage to said laser light modulator intermittently in accordance with signals from a timing module, thereby controlling polarization of said laser light;
   (c) directing said laser light from said laser light modulator into a first polarization analyzer which either rejects or transports said laser light according to whether or not said laser light has been polarized by said laser light modulator;
   (d) directing any said laser light which is transported by said first polarization analyzer through a first focusing lens into a first optical fiber, and thence into a first laser rod in an ignitor laser;
   (e) splitting beam of any said laser light rejected by said first polarization analyzer into a first portion and a second portion;
   (f) directing said first portion of said laser light rejected by said first polarization analyzer through a second focusing lens into a second optical fiber and thence into a beam combiner;

(g) directing said second portion of said laser light rejected by said first polarization analyzer through a third focusing lens into a third optical fiber, and thence into a second laser rod in said ignitor laser;

(h) directing output of said second laser rod in said ignitor laser into said first leaser rod in said ignitor laser;

(i) combining output of said first laser rod in said ignitor laser in said beam combiner with any light rejected by said second polarization analyzer to form a combined beam;

(j) directing said combined beam through a focusing lens into a combustible fuel.

15. The method recited in claim 14 wherein said laser light rejected by said first polarization analyzer is split into said first portion and said second portion by directing laser light rejected by said first polarization analyzer through an output coupler into a halfwave plate to deliver selected portions of differently polarized light to a second polarization analyzer which rejects said first portion and does not reject said second portion, thereby splitting said laser light rejected by said first polarization analyzer.

16. The method recited in claim 14 wherein said second optical fiber delays said first portion of said second portion of said excitation light beam so that said first portion of said second portion of said excitation light beam arrives at said beam combiner at a later time than said laser light which is transported by said first polarization analyzer and a later time than said any light not rejected by said second polarization analyzer.

17. The method recited in claim 16 wherein said second optical fiber delays said first portion of said second portion of said excitation light beam so that said first portion of said second portion of said excitation light beam arrives at said beam combiner about 30 to 60 nanoseconds later than excitation light is output from said first optical fiber and said second optical fiber.

18. The method recited in claim 14 wherein pulses of light reaching said beam combiner are spatially overlapped and co-axially propagated.

19. The method recited in claim 14 wherein said beam from said excitation light source is a pulsed beam, having long duration low peak power pulses.

20. The method recited in claim 14 wherein said combined beam has both long duration low peak power pulses from said excitation light source and short duration high peak power pulses from said ignitor laser.

21. The method recited in claim 14 wherein voltage applied to said modulator is equal to halfwave voltage.

22. The method recited in claim 14 wherein said first ignitor laser rod functions as an amplifier.

23. The method recited in claim 14 wherein said second ignitor laser rod functions as an oscillator.

24. The method recited in claim 14 wherein said excitation light source outputs light with a wavelength in the range from about 200 nanometers to about 12 microns.

25. The method recited in claim 24 wherein said excitation light source outputs light with a wavelength of 820 nanometers.

26. The method recited in claim 14 wherein said excitation light source outputs light with a peak power in the range from about 100 kW to about 40 MW.

27. The method recited in claim 14 wherein said excitation light source outputs light with a pulse energy in the range from about 20 mJ to about 400 mJ.

28. The method recited in claim 14 wherein said excitation light source outputs light with a pulse width in the range from about 20 nanoseconds to about 300 nanoseconds.

29. The method recited in claim 14 wherein said excitation light source outputs long pulses of light alternated with shorter duration pulses of light.

30. The method recited in claim 14 wherein said ignitor laser beam has a wavelength in the range from about 200 nanometers to about 12 microns.

31. The method recited in claim 14 wherein said ignitor laser beam has a peak power from about 200 kW to about 250 MW.

32. The method recited in claim 14 wherein said ignitor laser outputs light with a pulse energy in the range from about 10 mJ to about 250 mJ.

33. The method recited in claim 14 wherein said ignitor laser outputs light with a pulse width in the range from about 1 nanosecond to about 60 nanoseconds.

* * * * *